(12) United States Patent  (10) Patent No.: US 7,434,094 B2
Fujita et al.  (45) Date of Patent: Oct. 7, 2008

(54) REMOTE COPY PROCESSING METHOD, PROGRAM, AND SYSTEM

(75) Inventors: Kenichi Fujita, Nagoya (JP); Haruyuki Matsuo, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 485 days.

(21) Appl. No.: 11/182,846

(22) Filed: Jul. 18, 2005

(65) Prior Publication Data

US 2006/0248381 A1  Nov. 2, 2006

(30) Foreign Application Priority Data

Apr. 28, 2005 (JP) ............................. 2005-131312

(51) Int. Cl.
*G06F 11/00* (2006.01)

(52) U.S. Cl. .............................. 714/6; 714/18; 709/227; 709/228

(58) Field of Classification Search ...................... None
See application file for complete search history.

(56) References Cited

U.S. PATENT DOCUMENTS 5,719,942 A * 2/1998 Aldred et al. ............... 709/228
6,061,807 A * 5/2000 Albert et al. ................... 714/3
6,862,689 B2 * 3/2005 Bergsten et al. ............... 714/4
2002/0152429 A1 * 10/2002 Bergsten et al. .............. 714/43
2006/0248200 A1 * 11/2006 Stanev ........................ 709/227
2006/0248350 A1 * 11/2006 Stanev ........................ 713/189

FOREIGN PATENT DOCUMENTS

JP   2004-112088   4/2004

* cited by examiner

*Primary Examiner*—Christopher S McCarthy
(74) *Attorney, Agent, or Firm*—Staas & Halsey LLP

(57) ABSTRACT

According to a copy instruction from a host, a session in which entire or partial data of a primary volume of a first RAID device of the copy source is transferred and copied to the same position of a secondary volume of a second RAID device of the copy destination through an inter-chassis path is established and executed based on session information. A computer of the host instructs the first RAID device of forcible stop of the session as to cause the session information to be deleted when the inter-chassis path is blocked, and causes the session information remaining in the second RAID device to be deleted by an instruction given via the first RAID device when the forcibly terminated session is tried to be started when the blocked inter-device path is connected and results in an error.

10 Claims, 25 Drawing Sheets

FIG. 7

| COMMAND NAME | ENGLISH COMMAND NAME | FUNCTIONS |
|---|---|---|
| 76 — PHYSICAL INFORMATION ACQUISITION COMMAND | Get Physical Information | ACQUIRE CHASSIS IDENTIFIER AND PHYSICAL DEVICE NUMBER. |
| 78 — SESSION ID ACQUISITION COMMAND | Get REC Session ID | ACQUIRE SESSION ID OF REMOTE COPY. |
| 80 — START COMMAND | Start REC | REGISTER AND EXECUTE REMOTE COPY. |
| 82 — STOP COMMAND | Stop REC | TERMINATE REMOTE COPY. WHEN REMOTE FLAG X'01' IS SPECIFIED, DELETE SESSION INFORMATION REMAINING ONLY IN COMPANION CHASSIS. |
| 84 — SESSION INFORMATION ACQUISITION COMMAND | Query REC | ACQUIRE SESSION INFORMATION OF REMOTE COPY. |
| 86 — SUSPEND COMMAND | Suspend REC | SUSPEND REMOTE COPY. |
| 88 — RESUME COMMAND | Resume REC | RESUME REMOTE COPY. |
| 90 — REMOTE CHASSIS IDENTIFIER ACQUISITION COMMAND | Get Remote Box ID | ACQUIRE IDENTIFIER(BOX ID) OF REMOTE CHASSIS WHICH IS PERMITTED TO PERFORM COMMUNICATION BETWEEN CHASSIS REQUIRED FOR STARTING REMOTE COPY. |

| BYTE | | DESCRIPTION |
|---|---|---|
| 0 | X'01' | |
| 1 | X'D0' | |
| 2-3 | NOT USED (ALL X'00') | |
| 4 | SPECIFY INITIAL COPY SKIP<br>X'00' : PERFORM REGISTER/EXECUTION OF REC<br>X'01' : ASSUME THAT EQUIVALENCE-MAINTAINED STATE IMMEDIATELY AFTER REC REGISTRATION IS ATTAINED, AND PERFORM SUSPEND IMMEDIATELY. (SPECIFY USER AREA OF COPY DESTINATION VOLUME FOR LU FORMAT.)<br>X'02' : ASSUME THAT X'00' IS SPECIFIED.<br>X'03' : ASSUME THAT EQUIVALENCE-MAINTAINED STATE IMMEDIATELY AFTER REC REGISTRATION IS ATTAINED, AND PERFORM SUSPEND IMMEDIATELY. (DO NOT SPECIFY USER AREA OF COPY DESTINATION VOLUME FOR LU FORMAT.) | |
| 5-7 | NOT USED (ALL X'00') | |
| 8-11 | TRANSFER DATA LENGTH | |
| 12-15 | NOT USED(ALL X'00') | |

| OFFSET | BYTE 0 | BYTE 1 | BYTE 2 | BYTE 3 |
|---|---|---|---|---|
| 0000 | RESERVED | | | |
| 0004 | DATA LENGTH OF THAT FOLLOWING X'08' | | | |
| 0008 | RESERVED | | | |
| 000C | RESERVED | | | |
| 0010 | PRIMARY SESSION ID | | SECONDARY SESSION ID | |
| 0014 | FLAGS (Flags) | RESERVED | | |
| 0018 | RESERVED | | | |
| 001C | RESERVED | | | INTERNAL COPY INTERVAL |
| 0020 | RESERVED | | | |
| 0024 | RESERVED | | | |
| 0028 | RESERVED | | | |
| 002C | RESERVED | | | |
| 0030 : 0054 | PRIMARY-SIDE CHASSIS IDENTIFIER | | | |
| 0058 | RESERVED | | | |
| 005C | | | | |
| 0060 : 0084 | SECONDARY-SIDE CHASSIS IDENTIFIER | | | |
| 0088 | RESERVED | | | |
| 008C | | | | |
| 0090 : 00AC | SYSTEM DEFINITION (System Define) | | | |
| 00B0 | COPY TARGET VOLUME TYPE | RESERVED | | |
| 00B4 | ADVANCE/COPY TARGET PRIMARY HOST DEVICE IDENTIFIER (4 BYTES) | | | |
| 00B8 | ADVANCE/COPY TARGET SECONDARY HOST DEVICE IDENTIFIER (4 BYTES) | | | |
| 00BC | NUMBER OF SPECIFIED AREAS (Extent Count) | | | |
| 00C0 | AREA INFORMATION (Extent Descriptor) | | | |
| 00C4 | COPY STARTING TRACK NUMBER/COPY COMPLETING TRACK NUMBER | | | |
| 00C8 | | | | |
| 00CC | | | | |

| BYTE | DESCRIPTION |
|------|-------------|
| 0 | X'02' |
| 1 | X'DF' |
| 2-15 | NOT USED (ALL X'00') |

FIG. 12

| BYTE | DESCRIPTION |
|---|---|
| 0 | X'02' |
| 1 | X'D1' |
| 2-3 | NOT USED (ALL X'00') |
| 4 | INFORMATION TYPE<br>X'01' : SESSION LIST<br>X'02' : DETAILED INFORMATION OF PARTICULAR SESSION<br>X'03' : DETAILED SESSION INFORMATION OF PARTICULAR VOLUME(MLU)<br>X'06' : DETAILED REMOTE SESSION INFORMATION OF PARTICULAR VOLUME(MLU) |
| 5 | CONFIRM/ENTRY NUMBER<br>IF INFORMATION TYPE IS X'01'<br>　NOT USED (ALL X'00')<br>IF INFORMATION TYPE IS X'02' AND X'03'<br>　X'00' : NOTIFY STATUS OF ITS OWN CHASSIS<br>　X'01' : NOTIFY STATUS CONSIDERING STATUS OF COPY SOURCE CHASSIS<br>IF INFORMATION TYPE IS X'06'<br>　fcu ENTRY(X'00'- X'0F') : ENTRY NUMBER FORMING A PAIR WITH REMOTE CHASSIS IDENTIFIER |
| 6-7 | INFORMATION TYPE IS<br>IF X'01' : X'0000'<br>IF X'02' : SESSION ID (X'0000'-X'FFFF')<br>IF X'03' : VOLUME NUMBER OF ITS OWN CHASSIS (X'0000'-DEVICE MLU UPPERMOST LIMIT)<br>IF X'06' : VOLUME NUMBER OF COMPANION CHASSIS MLU NUMBER<br>　　　　　(X'0000'-DEVICE MLU UPPERMOST LIMIT) |
| 8-15 | NOT USED (ALL X'00') |

FIG. 13

| OFFSET | BYTE 0 | BYTE 1 | BYTE 2 | BYTE 3 |
|---|---|---|---|---|
| 0000 | INFORMATION TYPE X'06' | RESERVED | | |
| 0004 | DATA LENGTH OF THAT FOLLOWING X'08' | | | |
| 0008 | RESERVED | | | |
| 000C | RESERVED | | | |
| 0010 .. 00D4 | DETAILED SESSION INFORMATION #0 (200 BYTES) | | | |
| 1848 .. 190C | DETAILED SESSION INFORMATION #31 (200 BYTES) | | | |

| OFFSET | DESCRIPTION | | | |
|---|---|---|---|---|
| 0008 : 000C | ERROR AREA INFORMATION (Error Extent Descriptor) | | | |
| 0010 | PRIMARY SESSION ID | | SECONDARY SESSION ID | |
| 0014 | FLAGS (Flags) | PHASE (Phase) | STATUS (Status) | ERROR CODE (Error Code) |
| 0018 | ELAPSED TIME (Elapsed Time, sec) | | | |
| 001C | RESERVED | | | INTERNAL COPY INTERVAL |
| 0020 | COPY TARGET TOTAL TRACK NUMBER (Total Track Count) | | | |
| 0024 | COPIED TOTAL TRACK NUMBER (Copied Track Count) | | | |
| 0028 | EC/REC OPERATION MODE FLAG | RESERVED | | |
| 002C | RESERVED | | | |
| 0030 : 0054 | PRIMARY-SIDE CHASSIS IDENTIFIER | | | |
| 0058 005C | RESERVED | | | |
| 0060 : 0084 | SECONDARY-SIDE CHASSIS IDENTIFIER | | | |
| 0088 008C | RESERVED | | | |
| 0090 : 00AC | SYSTEM DEFINITION (System Define) | | | |
| 00B0 | COPY TARGET VOLUME TYPE (Volume Type) | | | |
| 00B4 | ADVANCE/COPY TARGET PRIMARY HOST DEVICE IDENTIFIER (4 BYTES) | | | |
| 00B8 | ADVANCE/COPY TARGET SECONDARY HOST DEVICE IDENTIFIER (4 BYTES) | | | |
| 00BC | NUMBER OF SPECIFIED AREAS (Extent Count) | | | |
| 00C0 | AREA INFORMATION (Extent Descriptor) | | | |
| 00C4 00C8 00CC | COPY STARTING TRACK NUMBER/COPY COMPLETING TRACK NUMBER | | | |

FIG. 15

| BYTE | DESCRIPTION |
|---|---|
| 0 | X'01' |
| 1 | X'D1' |
| 2 | X'00' |
| 3 | NOT USED (ALL X'00') |
| 4 | FORCIBLE STOP FLAG (Force Stop Flag)<br>X'00' : TERMINATE SESSION WHICH IS IN ANY OF THE FOLLOWING STATE.<br>RESERVED STATE (Reserve)<br>EQUIVALENCE-MAINTAINED STATE(Equivalent) AND BEING NORMALLY ACTIVE(Active)<br>EQUIVALENCE-MAINTAINED STATE(Equivalent) AND SUSPENDED STATE(Suspend)<br>X'01' : TERMINATE SESSION REGARDLESS OF PROCESSING STATE. |
| 5 | REMOTE FLAG (Remote Flag)<br>X'00' : FORCIBLY DELETE SESSION WHICH IS PRESENT IN COMMAND-INPUT CHASSIS<br>X'01' : FORCIBLY DELETE SESSION WHICH IS PRESENT ONLY IN COMPANION CHASSIS<br>(FORCIBLY DELETE SESSION REGARDLESS OF SPECIFICATION OF FORCIBLE STOP FLAG OF BYTE 4) |
| 6-7 | NOT USED (ALL X'00') |
| 8-11 | TRANSFER DATA LENGTH |
| 12-15 | NOT USED (ALL X'00') |

FIG. 16

| OFFSET | BYTE 0 | BYTE 1 | BYTE 2 | BYTE 3 |
|---|---|---|---|---|
| 0000 | INFORMATION TYPE X'06' | RESERVED | | |
| 0004 | DATA LENGTH OF THAT FOLLOWING X'08' (Length) | | | |
| 0008 | RESERVED | | | |
| 000C | RESERVED | | | |
| 0010 .. 00CC | DETAILED SESSION INFORMATION #0 (200 BYTES) | | | |

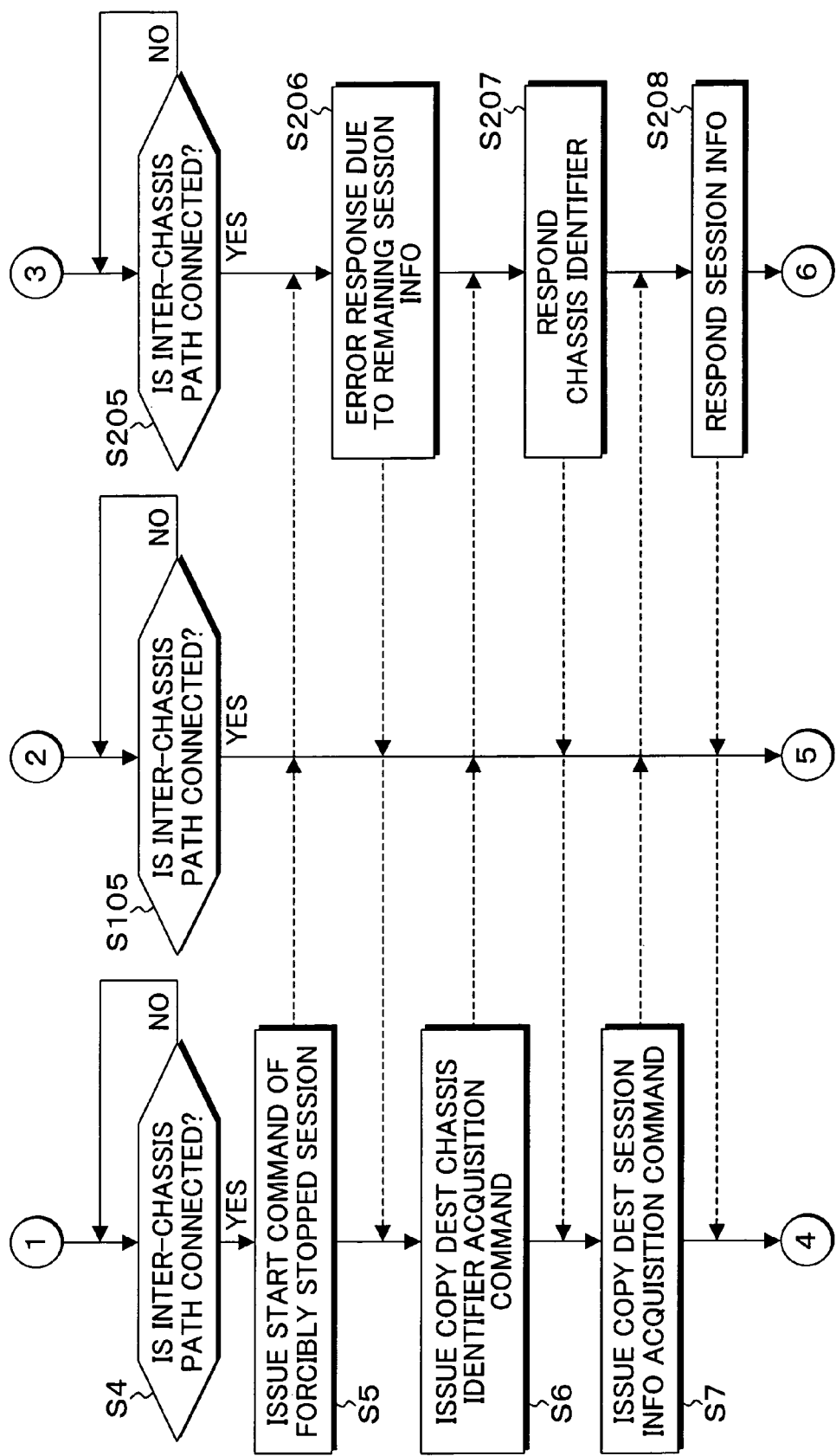

REMOTE COPY PROCESSING METHOD, PROGRAM, AND SYSTEM

This application is a priority based on prior application No. JP 2005-131312, filed Apr. 28, 2005, in Japan.

BACKGROUND OF THE INVENTION

1. Field of the Invention

The present invention relates to a remote copy processing method, a program, and a system for establishing and executing a session in which a volume of a RAID device connected to a host serves as a copy source and a volume of another RAID device connected thereto by an inter-chassis path serves as a copy destination; and particularly relates to a remote copy processing method, a program, and a system for establishing and executing again the same session, according to instructions from the host, when the path is connected after the session is suspended due to blockage of the inter-chassis path during copying.

2. Description of the Related Arts

Conventionally, in remote copy performed between two RAID devices installed in separate chassis which are away from each other with a distance there between, as shown in FIG. 20, RAID devices 200 and 202 are connected to hosts 204 and 206, respectively, and, for example, according to a copy-instruction start command and session information issued from the host 204, a copy session is established between the RAID devices 200 and 202, thereby executing remote copy.

In this remote copy performed by establishing a session, the entire or partial data of a primary volume 208 of the first RAID device 200 which is specified as a copy source is transferred and copied to the same track position of a secondary volume 210 of the second RAID device 202 which is specified as a copy destination via an inter-chassis path 212.

If blockage occurs, while such remote copy is being executed, in the inter-chassis path 212 connecting the RAID devices 200 and 202, the session is forcibly released by a stop command from the host 204. In this case, although the session information can be deleted in the RAID device 200 of the copy source by releasing the session, the session information of the cancelled session remains in the RAID device 202 of the copy destination.

Then, when the chassis path 212 is connected, a start command and session information of the forcibly released session are issued from the host 202 so as to start over the remote copy from the beginning. However, the session information of the forcibly released session is remaining in the RAID device 202 of the copy destination; therefore, the start command and the session information received for establishing the same session again via the RAID device 200 result in a command error, and the session cannot be resumed. In such case, when the remaining session information is deleted by an instruction from the host 206 which is connected to the RAID device 202 of the copy destination, the forcibly cancelled session can be established thereafter by an instruction from the host 204, thereby starting over the remote copy from the beginning.
[Patent Document] Japanese Patent Application Laid-Open (kokai) No. 2002-297455

Meanwhile, in an online backup system and the like, as shown in FIG. 2, the RAID device 202 for backup having no host is connected to the business-use RAID device 200 which is connected to the host 204 by the inter-chassis path 212, and, according to a copy-instruction start command and session information issued from the host 204, a copy session is established between the RAID devices 200 and 202, thereby executing remote copy, so as to generate a volume for backup in the RAID device 202. However, there is a problem that, in a case in which the RAID device 202 of the copy destination is not connected to any host, when blockage occurs in the inter-chassis path 212 and the session is forcibly released, the session information remaining in the RAID device 202 of the copy destination to which no host is connected cannot be deleted. In this case, the remaining session information is deleted by operations performed from a personal computer 214 for maintenance provided at the RAID device 202 of the copy destination, which takes labor and time since man-made operations are required. Particularly, if the copy destination is placed in, for example, a backup center at a remote place away from the copy source, a person in charge has to go to the copy destination from the copy source so as to perform operations of deleting the session information remaining in the copy destination. Therefore, there is a problem that start over of the forcibly released session of remote copy takes labor and time. According to the present invention is to provide a remote copy processing method, a program, and a system which enable quick start over of forcibly released remote copy by efficiently deleting the session information remaining in the copy destination having no host by instructions from a host connected to the copy source.

SUMMARY OF THE INVENTION

The present invention provides a remote copy processing method.

That is, the present invention is characterized by comprising, in a remote copy processing method having a first RAID device of a copy source connected to a host and a second RAID device of a copy destination connected to the first RAID device via an inter-device path (inter-chassis path), for establishing a session according to a copy instruction from the host and based on session information, and, according to the session information, establishing and executing the session for transferring and copying entire or partial data of a primary volume of the first RAID device which is specified as the copy source to the same position of a secondary volume of the second RAID device which is specified as a copy destination through the inter-device path (inter-chassis path), a copy source session releasing step of instructing the first RAID device of forcible stop of the session so as to cause the session information to be deleted when blockage of the inter-device path (inter-chassis path) is recognized; and a copy destination session releasing step of causing the session information remaining in the second RAID device to be deleted by an instruction given via the first RAID device when the forcibly terminated session is tried to be started when the blocked inter-device path is connected and results in an error.

Herein, as the copy destination session releasing step executed are a chassis identifier acquisition step of issuing an instruction for acquiring a chassis identifier to the second RAID device via the first RAID device, so as to acquire, from the second RAID device, the identifier of a chassis which is permitted to perform communication between chassis establishing the session;

a session information acquisition step of issuing an instruction for acquiring the session information specifying the chassis identifier acquired in the chassis identifier acquisition step and the secondary volume to the second RAID device via the first RAID device, so as to acquire the session information from the second RAID device; and a session information deleting step of issuing an instruction for deleting the session information of the copy destination and the session information of the second RAID device acquired in the session information acquisition step to the second RAID device via the first RAID device, so as to delete the session information remaining in the second RAID device.

Moreover, in the chassis identifier acquisition step, an entry number having a short data length and forming a pair with the chassis identifier as the chassis identifier of the second RAID device is acquired; and, in the session information acquisition step, the entry number and the secondary volume are specified so as to acquire the session information of the second RAID device.

The present invention provides a program executed by the computer of the host. The program of the present invention is characterized by causing the computer of the host having a first RAID device connected to the host and a second RAID device connected to the first RAID device via an inter-device path, for establishing a session according to a copy instruction from the host and based on session information, and transferring and copying entire or partial data of a primary volume of the first RAID device which is specified as a copy source to the same position of a secondary volume of the second RAID device which is specified as a copy destination through the inter-device path to execute a copy source session releasing step of instructing the first RAID device of forcible stop of the session so as to cause the session information to be deleted when blockage of the inter-device path is recognized; and a copy destination session releasing step of causing the session information remaining in the second RAID device to be deleted by an instruction given via the first RAID device when the forcibly terminated session is tried to be started when the blocked inter-device path is connected and results in an error.

The present invention provides a remote copy processing system. That is, the present invention is characterized by comprising, in a remote copy processing system having a first RAID device connected to a host and a second RAID device connected to the first RAID device via an inter-device path, for establishing a session according to a copy instruction from the host and based on session information, and, according to the session information, establishing and executing a session for transferring and copying entire or partial data of a primary volume of the first RAID device which is specified as a copy source to the same position of a secondary volume of the second RAID device which is specified as a copy destination through the inter-device path, a copy source session releasing unit for causing the host to instruct the first RAID device of forcible stop of the session so as to delete the session information when blockage of the inter-device path is recognized; and a copy destination session releasing unit for causing the host to delete the session information remaining in the second RAID device by an instruction given via the first RAID device when the forcibly terminated session is tried to be started when the blocked inter-device path is connected and results in an error.

It should be noted that details of the program and the system of the remote copy processes according to the present invention are basically same as that of the remote copy processing method of the present invention.

According to the present invention, even when the session information remains in the RAID device of the copy destination, after the session is established between the RAID device of the copy source connected to the host and the RAID device of the copy destination connected to no host, and the session of the copy source RAID device is forcibly terminated due to blockage of the inter-chassis path occurred during execution of remote copy; when the inter-chassis path is connected, by virtue of instructions from the host connected to the copy source, the session remaining in the copy destination can be deleted by issuing commands, man-made operations of the maintenance personal computer of the copy destination are made unnecessary, and, even if the copy destination is present in a remote place like a backup center, as an error recovery process of the host, the session information remaining in the copy destination is quickly deleted, and the forcibly stopped session is established again, thereby resuming the remote copy.

Moreover, when specification of parameters required for deleting the session information of the copy destination is added to the parameters of the session information collection command and the stop command which is according to the command interface provided by the host, realization of remote copy can be readily carried out by utilizing an existing command system. The above and other objects, features, and advantages of the present invention will become more apparent from the following detailed description with reference to the drawings.

BRIEF DESCRIPTION OF THE DRAWINGS

FIG. 7 is an explanatory drawing of a command list provided by a command interface of the host of the present invention;

FIG. 8 is an explanatory drawing of the start command used in the present invention;

FIG. 9 is an explanatory drawing of the session information which is transferred by the start command of FIG. 8;

FIG. 10 is an explanatory drawing of the remote chassis identifier acquisition command which is used in the present invention;

FIG. 12 is an explanatory drawing of the session information acquisition command which is used in the present invention;

FIG. 13 is an explanatory drawing of the session information acquired from the copy destination by the session information acquisition command of FIG. 12;

FIG. 14 is an explanatory drawing of the detailed session information in FIG. 13;

FIG. 15 is an explanatory drawing of the stop command which is used in the present invention;

FIG. 16 is an explanatory drawing of the session information which is to be transferred to the copy destination by the stop command of FIG. 15;

FIGS. 17A to 17C are time charts of a remote copy process according to the present invention involving blockage of the inter-chassis path;

DETAILED DESCRIPTION OF THE PREFERRED EMBODIMENTS

Figure 1:
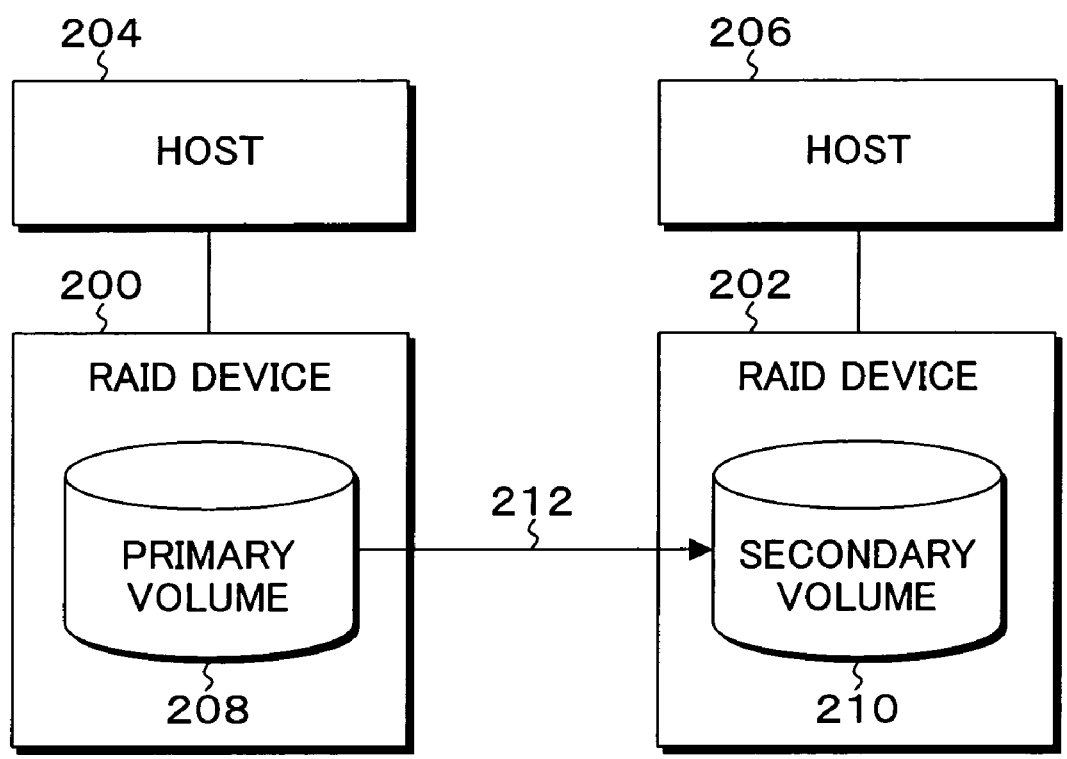
FIG. 1 is an explanatory drawing of a conventional remote copy process in a case in which a copy source RAID device and a copy destination RAID device are connected to hosts, respectively.
Figure 2:
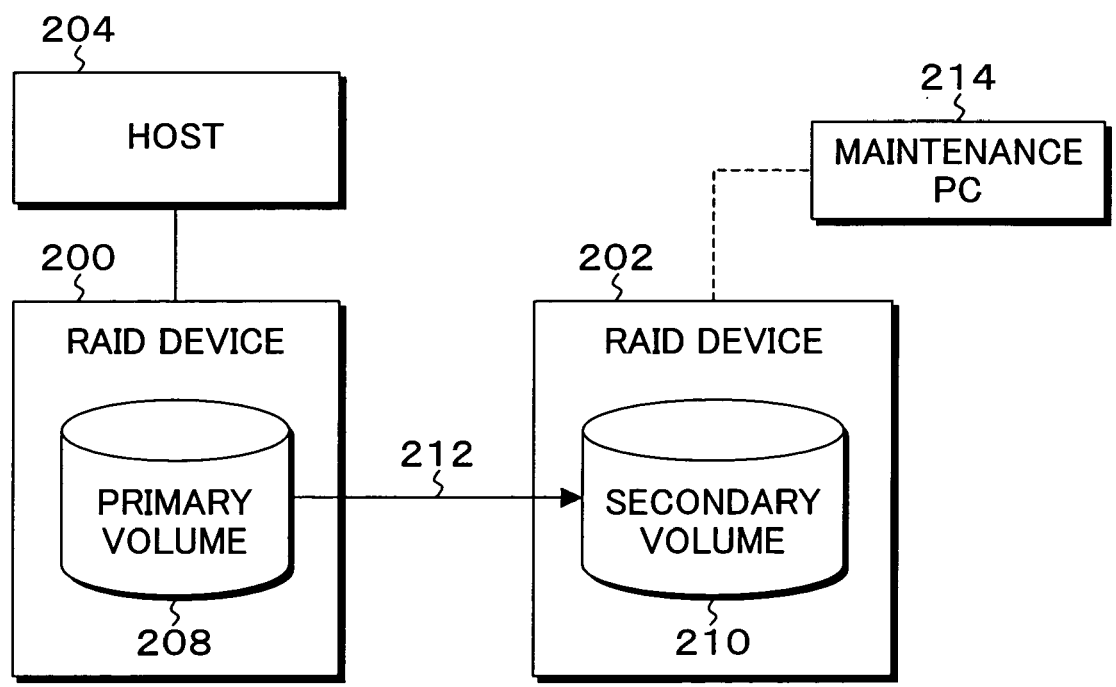
FIG. 2 is a explanatory drawing of a conventional remote copy process in a case in which a copy source RAID device is connected to a host and a copy destination RAID device is not connected to any host.
Figure 3:
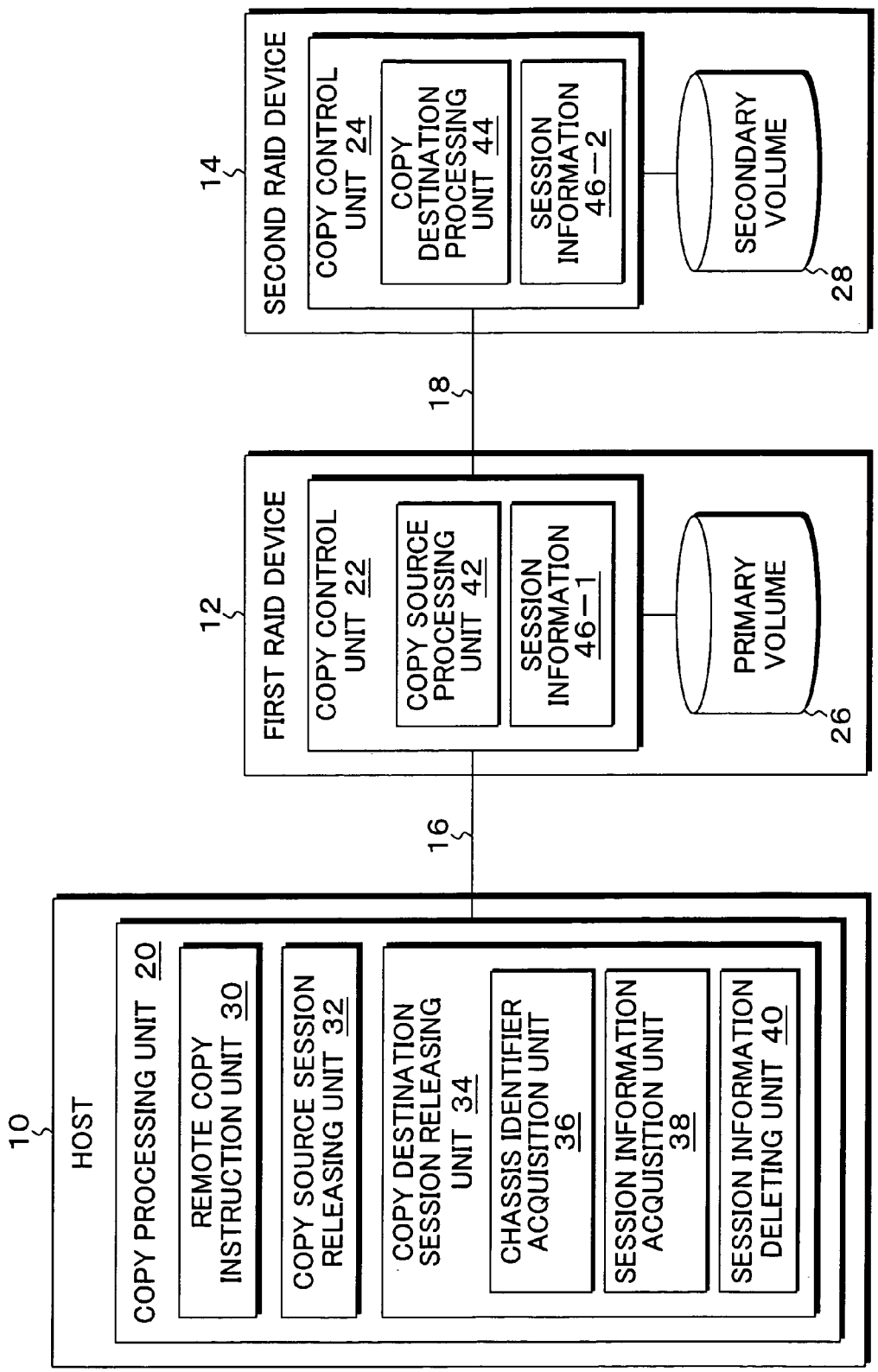
FIG. 3 is a block diagram of a system functional configuration of a remote copy process according to the present invention.

FIG. 3 is a block diagram of a system functional configuration of a remote copy process according to the present invention. In FIG. 3, the system for executing the remote copy process of the present invention comprises a host 10, a first RAID device 12 serving as a copy source, and a second RAID device 14 serving as a copy destination. The first RAID device 12 serving as the copy source is connected to the host 10 by a host path 16. The first RAID device 12 and the second RAID device 14 are connected by an inter-chassis path 18. Regarding the first RAID device 12, either one or both of a mainframe-based host and an open-based host may be connected by separate paths. If the distance between the chassis is short, the inter-chassis path 18 connecting the first RAID device 12 and the second RAID device 14 is connected by, for example, a Fiber Channel path, and if remote, it is connected via a WAN by use of the host path 16 and a converter, or connected by a dedicated line such as an ATM line. If the host 10 is a mainframe, it executes operation processes of core tasks, and, in addition to the functions of the core tasks, it is provided with functions of a copy processing unit 20 for remote copy according to the present invention. The first RAID device 12 and the second RAID device 14 are provided with functions of copy control units 22 and 24, respectively, for executing remote copy according to instructions from the host 10. A remote copy instruction unit 30 is provided in the copy processing unit 20 of the host 10; and when a command and session information are issued according to an instruction of the remote copy instruction unit 30, a session is established between the first RAID device 12 and the second RAID device 14, and remote copy in which the first RAID device 12 serves as a copy source and the second RAID device 14 serves as a copy destination is executed. Herein, basic processes of the remote copy in the present invention will be explained as the following. The remote copy according to the present invention is remote equivalent copy (Remote Equivalent Copy), which is a function of copying entire or partial data of a primary volume 26 of the first RAID device 12, which has been specified as the copy source, to the same track position (CCHH) of a secondary volume 28 of the second RAID device 14, which has been specified as the copy destination, through data transfer via the inter-chassis path 18. In the remote copy, according to a start command from the remote copy instruction unit 30 of the host 10, data transfer is started via the inter-chassis path 18 such that the data of the primary volume 26 and the secondary volume 28 becomes equivalent. However, when track data of the primary volume 26 which has already been transferred to the secondary volume 28 is updated by the host 10, data transfer for reflecting the newly updated data to the secondary volume 28 is performed. During the duration of the remote copy, the primary volume 26 and the secondary volume 28 are operated in a duplex state. This is called a duplex pair. While the duplex pair is set, the host 10 can access it as a single volume. After the duplex pair is cancelled when the remote copy is terminated in response to a stop command from the remote copy instruction unit 30 of the host, they can be accessed as two independent volumes. Although the equivalence of data of the primary volume 26 and the secondary volume 28 is maintained until the remote copy is stopped or terminated, the data is ensured to be delivered to the copy destination when the remote copy is terminated. Herein, when the remote copy is to be started according to a start command from the remote copy instruction unit 30 of the host 10, via the inter-chassis path 18 between the first RAID device 12 and the second RAID device 14, session information 46-1 and 46-2 is transferred together with the start command, and based on the session information 46-1 and 46-2, a session for the remote copy between the first RAID device 12 and the second RAID device 14 is established, thereby copying entire or partial data of the primary volume 26, which has been specified by the host 10, to the same track position of the secondary volume 28 through data transfer of the inter-chassis path 18. When line fault of the inter-chassis path 18, i.e., blockage of the inter-chassis path 18 occurs during execution of the remote copy which is performed by establishing a session by the remote copy instruction unit 30 of the host 10, the remote copy instruction unit 30 of the host 10 recognizes the blockage of the inter-chassis path 18, and operates a copy source session releasing unit 32, thereby instructing the first RAID device 12 to perform forcible stop of the session so as to cause it to delete the session information 46-1. If the inter-chassis path 18 is normal, the instruction by the copy source session releasing unit 32 for forcibly stopping the session is transmitted to the second RAID device 14 and effectively works; however, if the inter-chassis path 18 is blocked, forcible stop of the session of the second RAID device 14 cannot be executed, and the session information 46-2 of the forcibly terminated session remains in the second RAID device 14. When the inter-chassis path 18 is normally connected after the session is forcibly stopped, since the forcibly aborted session is to be executed again, the remote copy instruction unit 30 tries to establish a session of remote copy between the first RAID device 12 and the second RAID device by issuing a start command using the same session information. However, since the session information 46-2 of the forcibly terminated previous session is remaining in the second RAID device 14 of the copy destination, a command error occurs. In such case, a copy destination session releasing unit 34 provided in the host 10 is activated, thereby deleting the session information 46-2 remaining in the second RAID device 14 of the copy destination. That is, when a command error is caused since, when the closed inter-chassis path 18 is connected, although a session is tried to be started by issuing a start command using the same session information as the forcibly terminated session, the previous session information 46-2 is remaining, with respect to the start command, in the second RAID device 14; the copy destination session releasing unit 34 causes the session information 46-2 remaining in the second RAID device 14 to be deleted by an instruction given via the first RAID device 12. The process performed by the copy destination session releasing unit 34 is executed by the functions of a chassis identifier acquisition unit 36, a session information acquisition unit 38, and a session information deleting unit 40. The deleting process of the session information 46-2 of the copy destination is according to the following procedure. (1) The chassis identifier acquisition unit 36 issues an instruction command for acquiring a chassis identifier to the second RAID device 14 via the first RAID device 12, and acquires the identifier of the chassis, from the second RAID device 14, which is permitted to perform communication between the session-established chassis. (2) The session information acquisition unit 38 issues, to the second RAID device 14 via the first RAID device 12, an instruction command for acquiring session information specifying the chassis identifier of the copy destination, which has been obtained by the chassis identifier acquisition unit 36, i.e., the remote chassis identifier and the secondary volume 28, thereby acquiring the remaining session information 46-2 from the second RAID device 14. (3) The session information deleting unit 40 issues, to the second RAID device 14 via the first RAID device 12, a command serving as an instruction for deleting the session information of the second RAID device 14 serving as the copy destination, and the session information 46-2 remaining in the second RAID device 14 which has been acquired by the session information acquisition unit 38, thereby causing the session information 46-2 remaining in the second RAID device 14 to be deleted. When the session information 46-2 of the second RAID device 14 which is remaining due to blockage of the inter-chassis path 18 can be deleted by the copy destination session releasing unit 34 of the host 10; the remote copy instruction unit 30 again issues a start command for starting the aborted session and the session information; according to the start command and the session information, the first RAID device 12 and the second RAID device 14 effectively establish a session for remote copy; and, in accordance with the establishment of the remote copy aborted in the inter-chassis path 18, i.e., the session, a process of transferring entire or partial data of the primary volume 26 which has been specified by the host 10 to the same track position of the secondary volume 28 of the second RAID device 14 via the inter-chassis path 18 and writing it therein is performed, thereby performing recovery of the aborted remote copy. As described above, even if session information remains in the copy destination due to forcible termination caused by blockage of the inter-chassis path 18 during remote copy, the session information remaining in the copy destination can be simply and readily deleted by instructions from the host 10 after the inter-chassis path 18 is connected, and even if no host is connected to the copy destination, the session information remaining in the copy destination can be simply and readily deleted by instructions from the host connected to the copy source, thereby starting over the session of the aborted remote copy.

Figure 4:
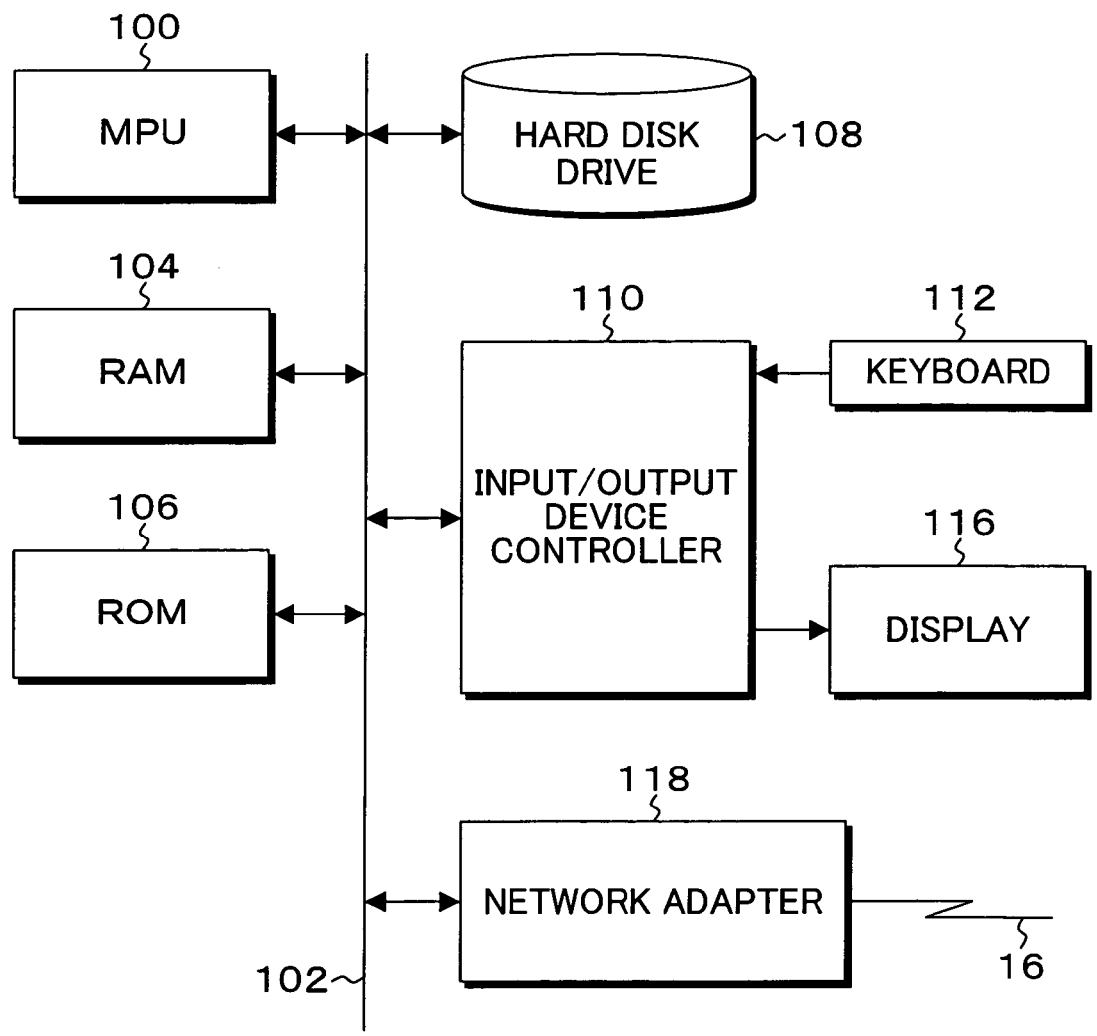
FIG. 4 is a block diagram of a hardware configuration of the host.

FIG. 4 is a block diagram of a hardware configuration of a computer used for the host 10 of FIG. 3. In the computer of FIG. 4, connected to a bus 102 of MPU 100 are a RAM 104, a ROM 106, a hard disk drive 108, an input/output device controller 110 to which a keyboard 112 and a display 116 are connected, and a network adapter 118 for connecting the host path 16. The hard disk drive 108 has a program for executing copy processes of the host 10 loaded thereon, which is read out by the hard disk drive 108 upon startup of the computer, deployed in the RAM 104, and executed by the MPU 100. Programs for operation processes performed by the host are also loaded on the hard disk drive 108, wherein the operation programs are deployed in the RAM 104 upon startup of the computer and executed by the MPU 100, thereby executing operation processes of the host.

Figure 5:
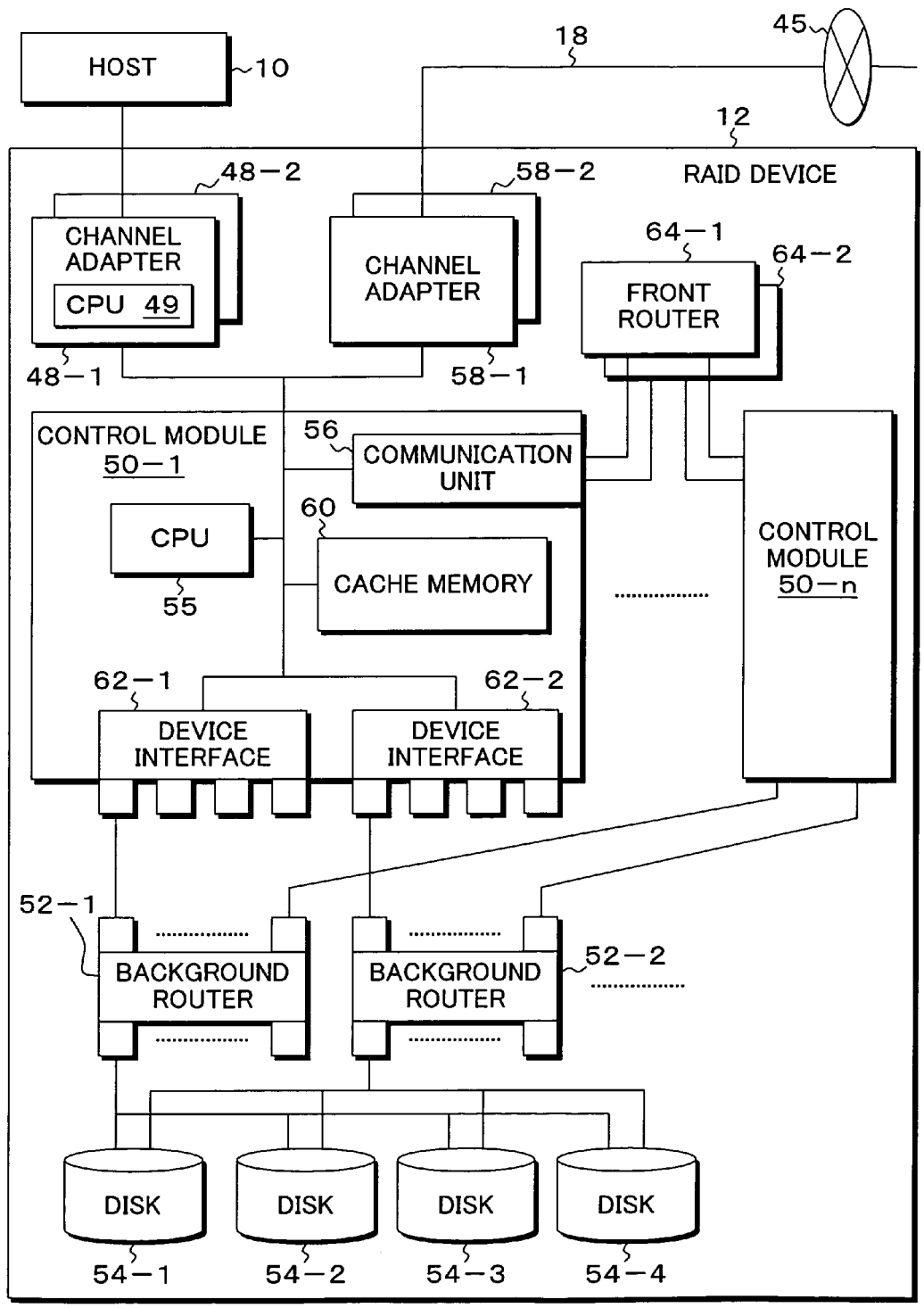
FIG. 5 is a block diagram of a hardware configuration of the RAID device of FIG. 3R.

FIG. 5 is a block diagram of a hardware configuration of the first RAID device of FIG. 3. Note that the second RAID device 14 also has the same hardware configuration. In FIG. 5, the first RAID device 12 is provided with channel adapters 48-1 and 48-2 having CPUs 49 provided therein, control modules 50-1 to 50-n, background routers 52-1 and 52-2, disk devices 54-1 to 54-4 such as hard disk drives having a redundant configuration of RAID, and front routers 64-1 and 64-2. For example, eight control modules can be mounted on the largest arrangement of the first RAID device 12. The channel adapters 48-1 and 48-2 are provided with the CPUs 49, and connect the mainframe-based host 10 to the control module 50-1. The channel adapters 58-1 and 58-2 connect an open-based host such as a UNIX (R)/IA server, and, in the present invention, the channel adapter 58-1 is further connected to the inter-chassis path 18 and connected to the second RAID device 14 of the copy destination via a network 45 such as a WAN. In each of the control modules 50-1 to 50-n, as representatively shown in the control module 50-1, a CPU 55, a communication unit 56, a cache memory 60, and device interfaces 62-1 and 62-2 are provided. The CPU 55 executes, by program control, resource processes, cache processes, RAID control, and copy control including the remote copy according to the present invention in the first RAID device 12. The front routers 64-1 and 64-2 connect other control modules 50-2 (not shown) to 50-n to the control module 50-1, thereby multiplexing the control. Each of the control modules 50-1 to 50-n is connected to the background routers 52-1 and 52-2, so as to perform data input/output processes according to RAID control performed by the CPUs 55 of the control module side.

Figure 6:
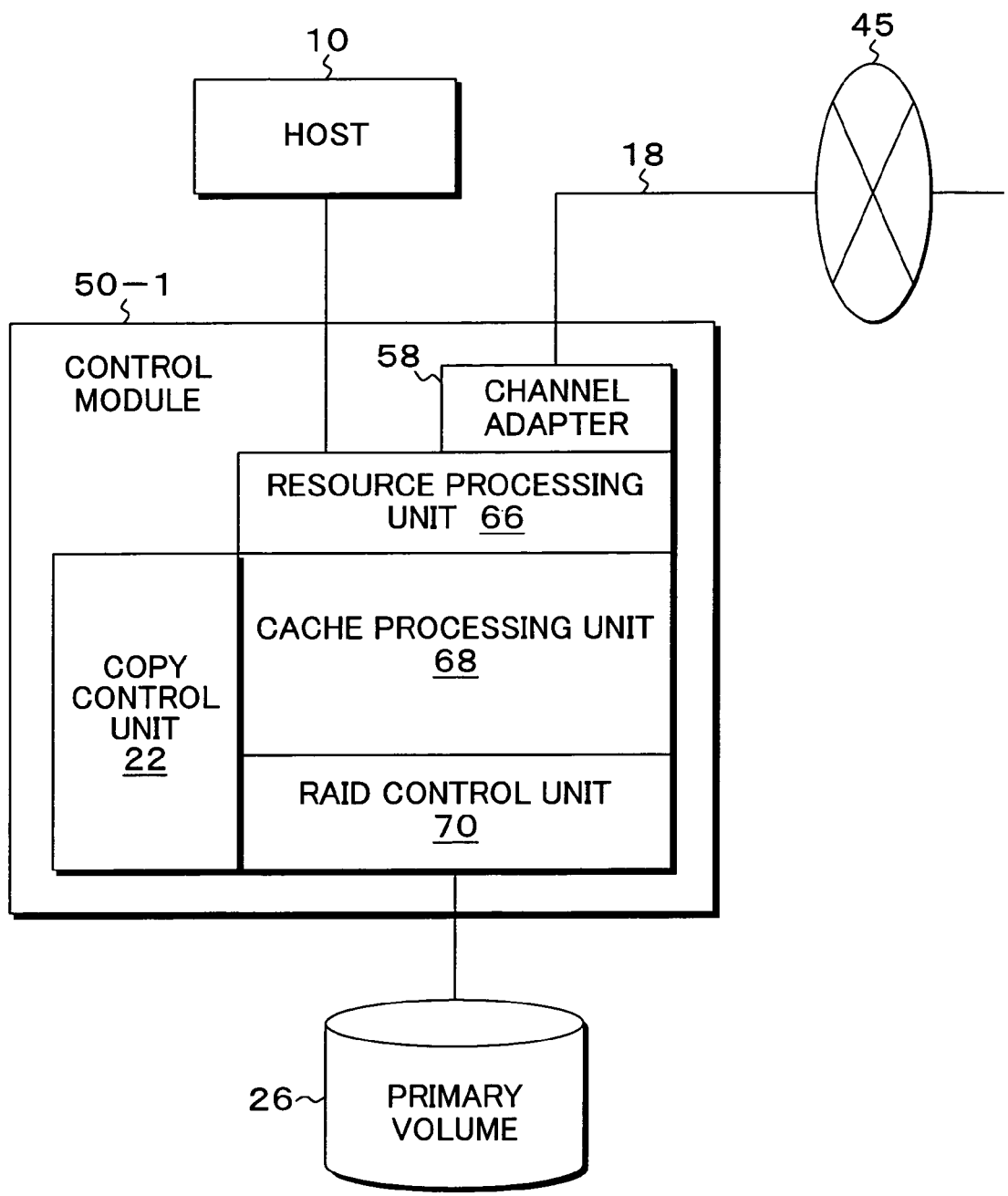
FIG. 6 is a block diagram of a functional configuration of the RAID device of FIG. 5.

FIG. 6 is a block diagram of a functional configuration of the first RAID device of FIG. 5. In FIG. 6, functions of the control module 50-1 are realized by program control of the CPU 55 provided in the control module 50-1 of FIG. 5, thereby forming a resource processing unit 66, a cache processing unit 68, a RAID control unit 70, and a copy control unit 22. The copy control unit 22 is provided with the function of copy processing unit 42 as shown in FIG. 3, and, when the copy source processing unit operates, the volume is used as the primary volume 26 serving as the copy source. As the RAID device having the hardware configuration and the functional configuration shown in FIG. 5 and FIG. 6, for example, a RAID device such as GR800 or ETERNUS6000 which are products of FUJITSU Co., Ltd may be used.

FIG. 7 is an explanatory drawing of a command list which is for remote copy and provided by a command interface provided in the host 10 of FIG. 3. In FIG. 7, in the command list 74 prepared are a physical information acquisition command 76, a session ID acquisition command 78, a start command 80, a stop command 82, a session information acquisition command 84, a resume command 86, a suspend command 88, and a remote chassis identifier acquisition command 90. The physical information acquisition command 76 acquires a chassis identifier and a physical device number. The session ID acquisition command 78 acquires a session ID of a remote copy process. The start command 80 registers and executes remote copy. Execution of the start command 80 includes transfer of session information. The stop command 82 terminates a remote copy process. When "X'01'" is specified as a remote flag provided as a parameter of the stop command 82, the command can be used for deleting the session information remaining only in the companion chassis which is serving as the copy destination. The session information acquisition command 84 acquires the session information of remote copy. The suspend command 86 suspends remote copy. The resume command 88 resumes suspended remote copy. In addition, the remote chassis identifier acquisition command 90 acquires the identifier (box ID) of the remote chassis which has been permitted to perform communication between the chassis which are required for starting remote copy. In the copy destination session releasing unit 34 of the host 10 shown in FIG. 3, in a process for deleting the session information 46-2 remaining in the second RAID device 14, which is serving as the copy destination, due to blockage of the inter-chassis path 18, the chassis identifier acquisition unit 36 issues the remote chassis identifier acquisition command 90, thereby acquiring the remote chassis identifier. Subsequently, the session information acquisition unit 38 issues the session information acquisition command 84 specifying the secondary volume 28 and the acquired remote chasses identifier, thereby acquiring the session information 46-2 of the copy destination. Subsequently, when the session information deleting unit 40 issues the stop command 82 specifying "X'01'" as the remote flag, and transfers the session information of the copy destination which has been acquired by the session information acquisition unit 38, the session information 46-2 remaining in the second RAID device 14 is deleted. In the command list of FIG. 7, the physical information acquisition command 76, the session ID acquisition command 78, the session information acquisition command 84, and the remote chassis identifier acquisition command 90 can be called as read-based commands, since data is transferred from the issue source along with issue of the commands. On the other hand, the start command 80, the stop command 82, the suspend command 86, and the resume command 88 can be called as write-based commands, since data transfer to the issue source is performed simultaneously with the command issue.

FIG. 8 is an explanatory drawing of the start command 80 of the present invention which is used in remote copy. The start command 80 is for performing registration and execution for starting the remote copy, and is provided with the following functions.

(1) Recognizing and setting the primary volume and the secondary volume as a duplex pair (setting of duplex pair).
(2) After the duplex pair is set, copying the data which is in the area specified by the host from the primary volume to the secondary volume (implementation of copy).
(3) Achieving synchronization between the primary volume and the secondary volume also after copy is completed (maintenance of equivalence). Such start command 80 for starting remote copy comprises Byte 0 to 15, wherein the Byte 0 to 1 includes command code "X'01D0'" representing that it is a start command. Byte 0 is specification of initial copy skip, and, when "X'01D0'" is specified as the initial copy skip specification in remote copy, registration and execution of remote copy can be performed.

FIG. 9 is an explanatory drawing of the session information 46 which is transferred by the start command 80 of FIG. 8. The session information 46 mainly comprises:
(1) data length of that following X'08',
(2) primary session ID and secondary session ID,
(3) a flag indicating remote copy when set to "1",
(4) internal copy intervals for specifying copy process intervals,
(5) primary-side chassis identifier,
(6) secondary-side chassis identifier,
(7) system definition for setting arbitrary information for applications of the host,
(8) copy target volume type specifying the type of the copy target volume,
(9) copy target primary host device identifier,
(10) copy target secondary host device identifier,
(11) the number of specified areas specifying all volume areas as the copy target when it is 0, and specifying the number of the areas when it is 1 or more, and
(12) area information according to copy starting track number/copy completing track number. The area information is provided in the number corresponding to that of the specified areas. FIG. 10 is an explanatory drawing of the remote chassis identifier acquisition command 90 which is used in the present invention. The remote chassis identifier acquisition command 90 acquires and notifies the identifier of the remote (copy destination) chassis which has been permitted to perform communication between the chassis. The remote chassis identifier is required when remote copy is to be started, and also required when the session information which is remaining in the copy destination and shown in FIG. 3 is to be deleted. The remote chassis identifier acquisition command 90 has command code "X'02DF'" of Byte 0 to 1.

Figure 11:
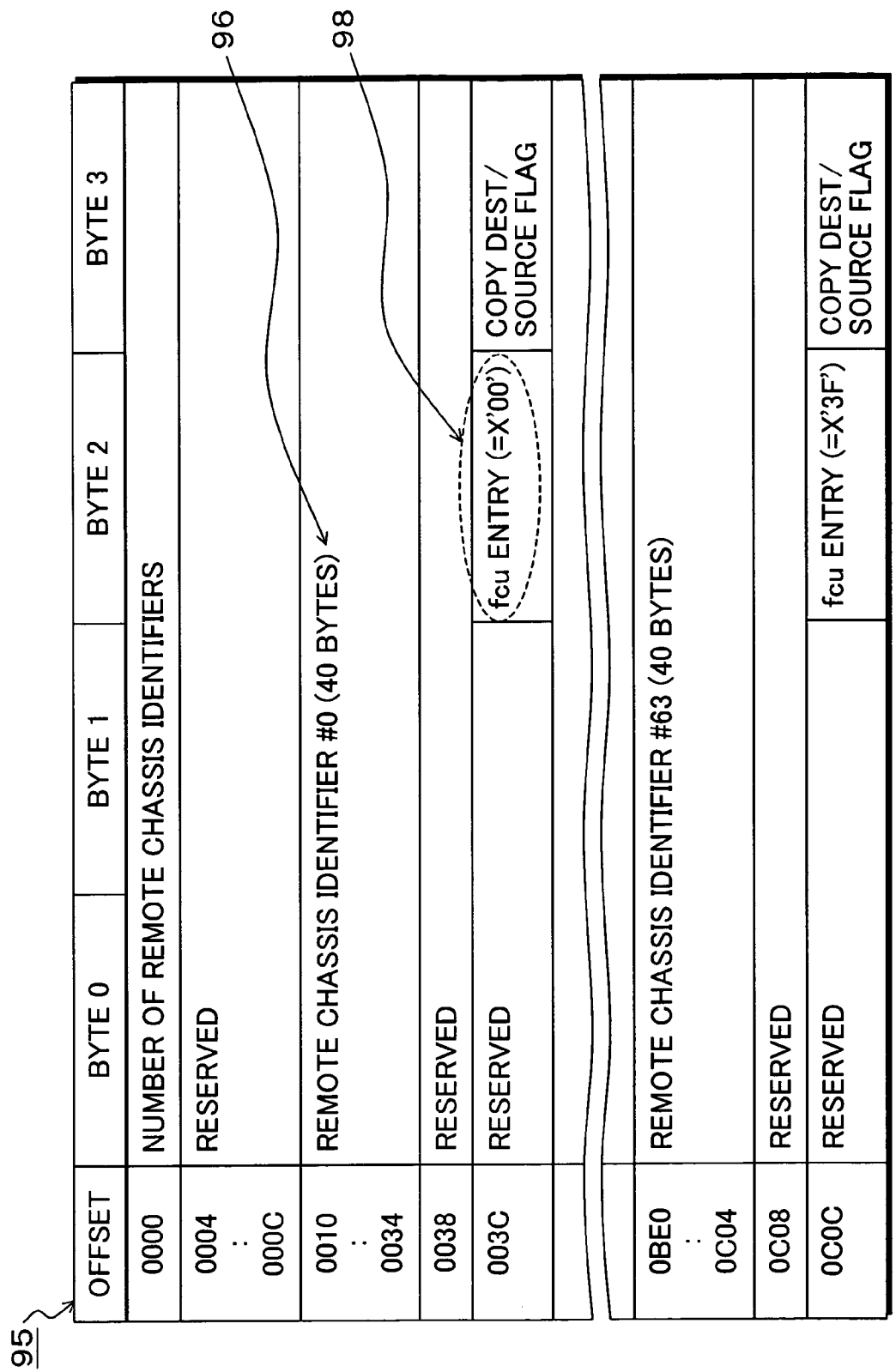
FIG. 11 is an explanatory drawing of effective remote chassis identifier information which is acquired by the remote chassis identifier acquisition command of FIG. 10.

FIG. 11 is an explanatory drawing of effective chassis identifier information 95 which is notified by the remote chassis identifier acquisition command 90 of FIG. 10. The effective chassis identifier information 95 includes the following information.
(1) Number of remote chassis identifiers
(2) Remote chassis identifiers
(3) Entry number
(4) Copy destination/copy source flags Herein, the chassis identifier acquisition unit 36 which is provided in the copy destination session releasing unit 34 provided in the host 10 of FIG. 3 acquires the chassis identifier from the second RAID device 14 which is serving as the copy destination by issuing the remote chassis identifier acquisition command 90 of FIG. 10; therefore, the effective chassis identifier information 95 of FIG. 11 is transferred thereto. In the present invention, regarding the thus acquired effective chassis identifier information 95, the remote chassis identifier 96 is not used, and the entry number "fcu entry" which is forming a pair with the remote chassis identifier 96 is acquired and used when the session information acquisition command is issued. This is for the reason that the remote chassis identifier 96 has a large data length, 40 bytes, which increases the data volume to be transferred in accordance with the specification of the session information acquisition command; therefore, instead of that, the entry number "fcu entry" which is forming a pair with the remote chassis identifier 96 and having a short data length is used.

FIG. 12 is an explanatory drawing of the session information acquisition command 84 which is used in the present invention. The session information acquisition command 84 acquires detailed information of a particular session or detailed session information of a particular volume. In the present invention, by use of the session information acquisition command 84, the detailed information of the session information 46-2 remaining in the second RAID device 14 which is serving as the copy destination shown in FIG. 3 is acquired. Therefore, "X'06'" is set as the information type in Byte 4, thereby specifying detailed remote session information of a particular volume (mainframe logical unit MLU). In addition, if the information type is "X'06'" as the entry number "fcu number" of Byte 5, the value of the entry number 98 obtained from the effective chassis identifier information 95 of FIG. 11 which has been acquired by the remote chassis identifier acquisition command 90 of FIG. 10, for example, "X'00'" is set. Moreover, if the information type is "X'06'" in Byte 6 to 7, the volume number of the companion chassis which is serving as the copy destination, specifically, a mainframe logical unit number "MLU number" is set. When the session information acquisition command 84 specifying such information type, an entry number, and a companion chassis module logical unit number, i.e., a volume number is issued to the second RAID device 14 via the first RAID device 12 of FIG. 3, notification of the session information 46 of FIG. 13 can be received.

The session information 46 of FIG. 13 has the following description.
(1) Information type "X'06'" indicating that it is detailed remote session information of a particular MLU, i.e., a copy destination volume
(2) Data length of that following offset "X'08'"
(3) Detailed session information Herein, the detailed session information which can be notified by the session information 46 may be up to 32 units of information, i.e., detailed session information 94-1 to 94-31. FIG. 14 focuses on and shows the detailed session information 94-1 which is one of the detailed session information of the copy destination in the session information 46 of FIG. 13 which is notified by the session information acquisition command 84 of FIG. 12. The detailed session information 94-1 has the following description.
(1) Error area information indicating the starting position and the end position of the area which was being processed when an error occurred
(2) Primary session ID indicating a session identifier of the copy source chassis
(3) Secondary session ID indicating an identifier of the session which is effective in the copy destination chassis
(4) Operation mode of remote copy
(5) Various process phase (idle, being reserved, being normally operated, error suspension, or suspension) of remote copy
(6) Error code indicating, if an error occurs, the error type
(7) Elapsed time
(8) Internal copy interval shown by means of phased display
(9) Total track number of the copy target
(10) Copied track number Operation mode indicating:
(11) if it is "0", a suspended state due to the suspend command, or
(12) if it is "1", a suspended state immediately after activation performed by the start command specifying initial copy skip.

The primary-side chassis identifier, the secondary-side chassis identifier, the system definition, the copy target volume type, the copy target primary host device identifier, the copy target secondary host device identifier, the number of specified areas, and the area information, which are subsequent to those described above, are same as that of the session information 46 of the start command 80 of FIG. 9.

FIG. 15 is an explanatory drawing of the stop command 82 which is used in the present invention. The stop command 82 terminates the remote copy process which is performed on the primary volume and the secondary volume. The copy terminating process performs the following processes.
(1) The information relevant to the session is released, thereby canceling the corresponding relation of the duplex pair (cancel duplex pair).
(2) If duplex pair cancellation is instructed during a copy process, an error is returned to the instruction without terminating the copy process, and a pair-set state is maintained. However, if a forcible termination parameter (forcible stop flag=X'01') is specified in the stop command for canceling the pair, forcible pair cancellation and process termination is performed (copy termination).
(3) After copy termination, the pair relation between the primary volume and the secondary volume is erased, and the session information is also deleted. In the stop command 82 for such remote copy termination, a command code "X'01Dd1'" is set in Byte 0 to 1, and a forcible stop flag is provided in Byte 4. In addition, a remote flag is provided in Byte 5, and when "X'01'" is specified, a deletion specification 85 for forcible deletion of the session information which is present only in the companion chassis serving as the copy destination can be performed.

FIG. 16 is an explanatory drawing of the session information 46 which is to be transferred to the copy destination by the stop command 82 of FIG. 15. The session information 46 is the session information 46 of FIG. 13 which has been acquired by the session information acquisition command 84 of FIG. 12, wherein merely the detailed session information 94-1 of the copy destination is provided as detailed session information, and the description of the detailed session information 94-1 is as shown in FIG. 14.

Figure 17A:
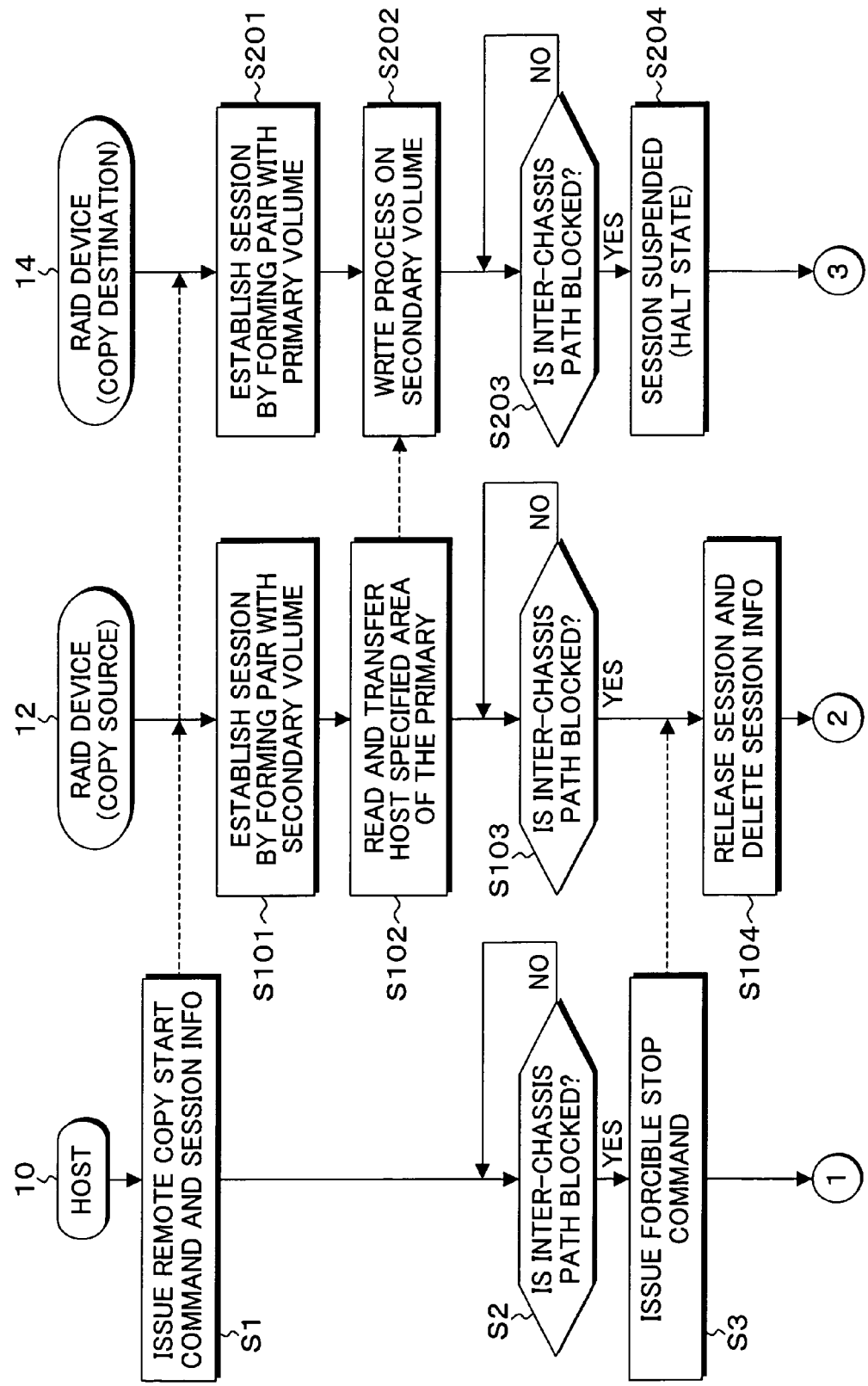
Figure 17C:
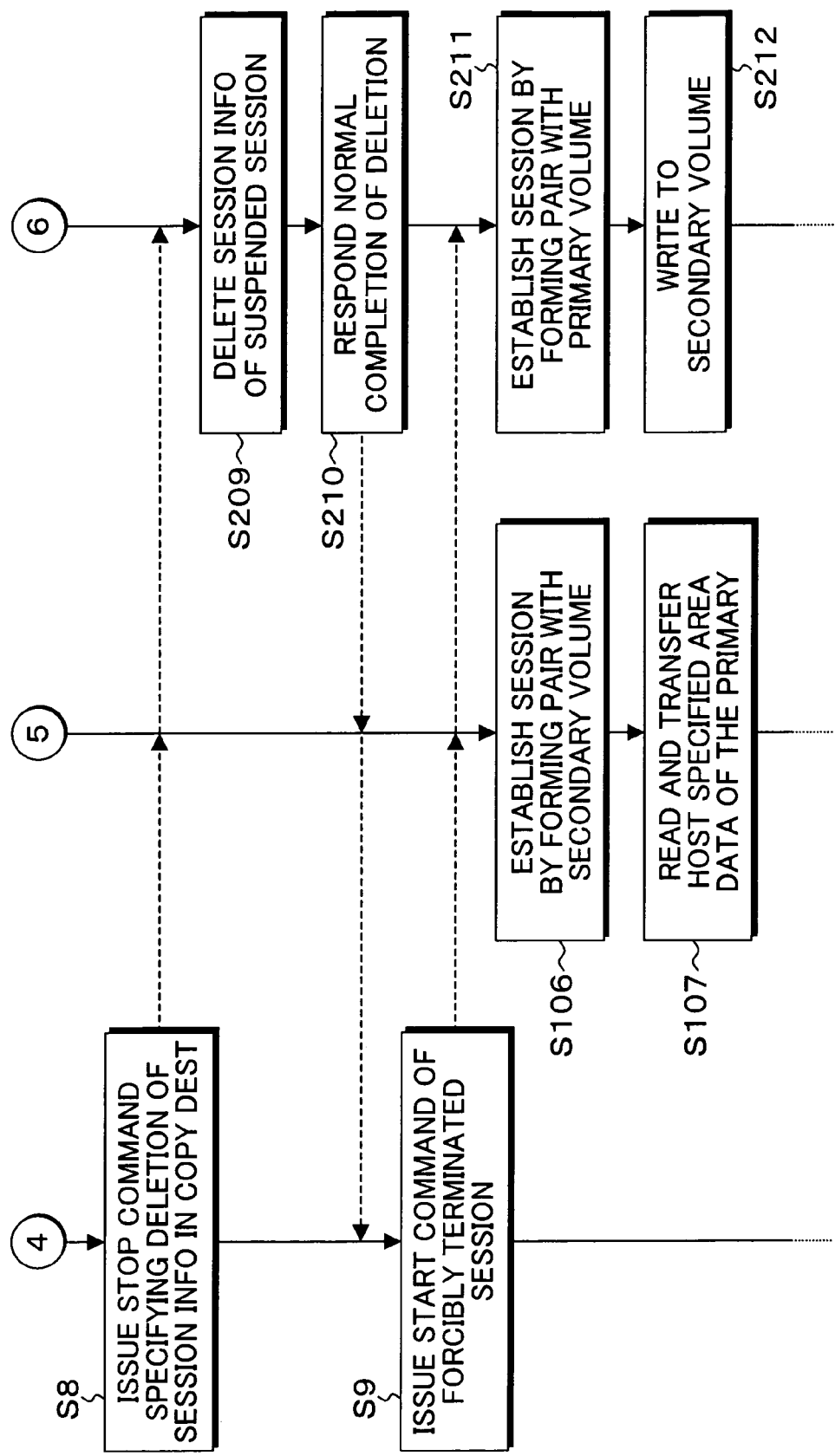

FIGS. 17A to 17C are time charts of a remote copy process according to the present invention involving blockage of the inter-chassis path. In FIGS. 17A to 17C, when the host 10 issues the start command of remote copy and session information in step S1, they are transferred to each of the first RAID device 12 of a copy source and the second RAID device 14 of a copy destination, and, in step S101, the first RAID device 12 establishes a session by pairing the primary volume 26 of its own with the secondary volume 28 of the copy destination. At the same time, in step S201, the second RAID device 14 establishes the session by pairing the secondary volume 28 of its own with the primary volume 26 of the copy source. When the session of remote copy is thus established; in step S102, the first RAID device reads out the host-specified area of the primary volume 26 and transfers it to the second RAID device 14 via the inter-chassis path 18; and in step S202, the second RAID device 14 executes remote copy of writing the transferred data to the same track position of the secondary volume 28. If blockage occurs in the inter-chassis path 18 during execution of such remote copy, the host 10, the first RAID device 12, and the second RAID device 14 detect the inter-chassis path blockage in step S2, S103, and S203, respectively. The host 10 which has detected the inter-chassis path blockage in step S2 issues the forcible stop command to the first RAID device 12 of the copy source in step S3. In response to this, the first RAID device 12 releases the session in step S104, thereby deleting the session information 46-1. However, since the inter-chassis path 18 is blocked, the forcible command from the host 10 cannot be delivered to the second RAID device 14 of the copy destination, and the second RAID device 14 suspends the session in step S204 in accordance with the inter-chassis path blockage, thereby coming into a halt state. Then, if the inter-chassis path 18 is connected again, the host 10, the first RAID device 12, and the second RAID device 14 detect the connection of the inter-chassis path 18 in steps S4, S105, and S205, respectively. The host 10 which has detected the connection of the inter-chassis path 18 issues the start command of the session, which has been forcibly suspended in step S5, to the first RAID device 12 and the second RAID device 14. However, since the session information of the remote copy which has been executed before blockage of the inter-chassis path 18 is remaining in the second RAID device 14, an error response is returned with respect to the start command in step S206. The host 10 which has received the error response from the second RAID device 14 starts a process in step S6 for deleting the session information 46-2 remaining in the copy destination. First, the command for acquiring the copy destination chassis identifier is issued in step S6, and the second RAID device 14 makes a response with the chassis identifier of the copy destination in step S207. Subsequently, in step S7, the copy destination session information acquisition command specifying the chassis identifier of the copy destination and the secondary volume 28 is issued, and, accordingly, the second RAID device 14 makes a response with the session information of the copy destination in step S208. Subsequently, in step S8, the host 10 issues the stop command specifying deletion of the session information 46-2 of the copy destination, and transfers the acquired session information of the copy destination. In response to the stop command and the session information, the second RAID device 14 of the copy destination deletes the remaining session information 46-2 in step S209, and makes a response to the host 10 that the deletion has been normally completed in step S210. In response to the response of normal completion of session information deletion, the host 10 issues the start command of the forcibly terminated session again in step S9; as a result, the first RAID device 12 and the second RAID device 14 establish a session in steps S106 and S211, respectively, and, remote copy is executed in steps S107 and S212 in the same manner as the case of steps S102 and 202, i.e., the data of the area of the primary volume 26 specified by the host is read out, transferred via the inter-chassis path 18, and written to the same track position of the secondary volume 28.

Figure 18A:
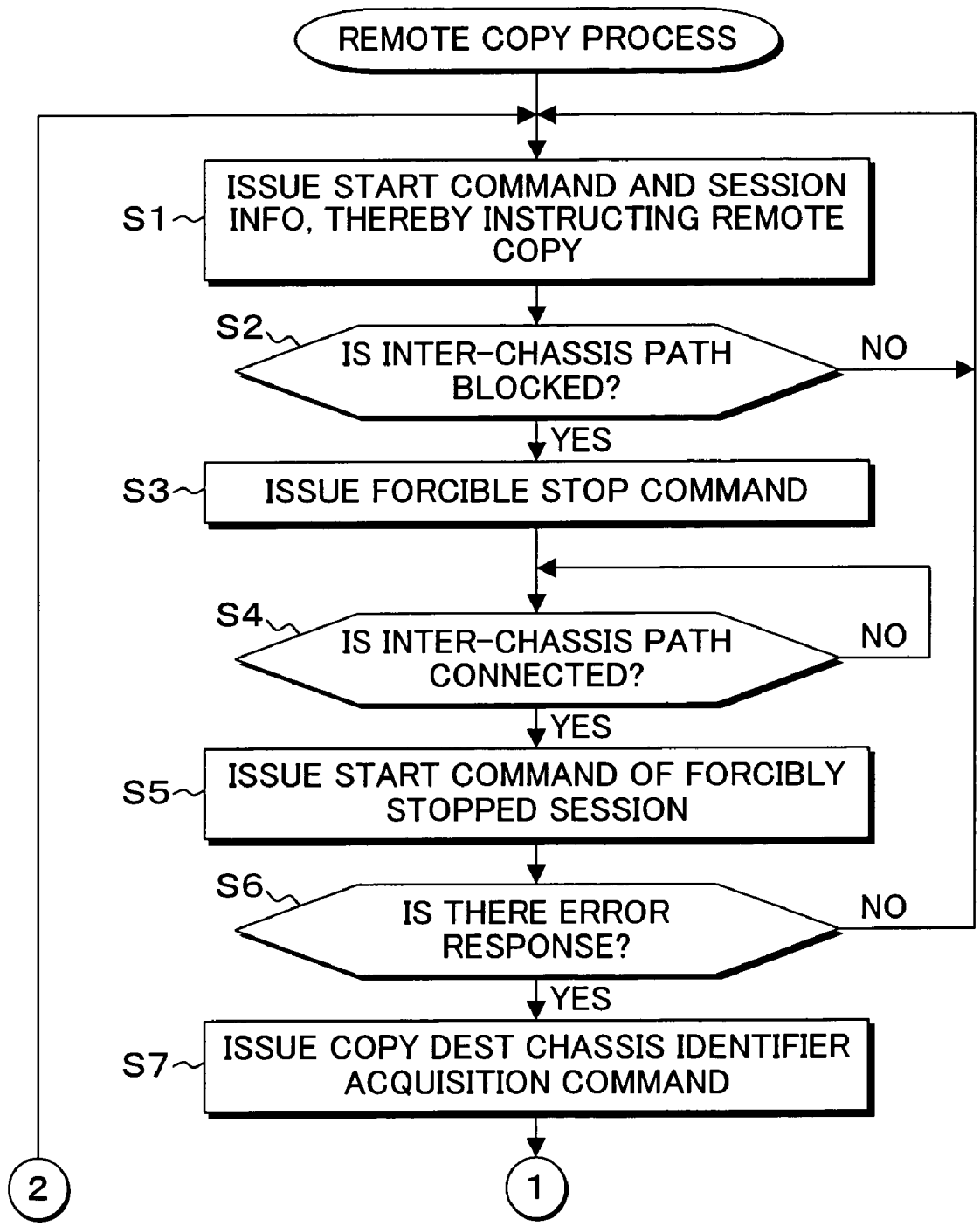
FIGS. 18A and 18B are flow charts of the remote copy process performed by the host of FIG. 3.
Figure 18B:
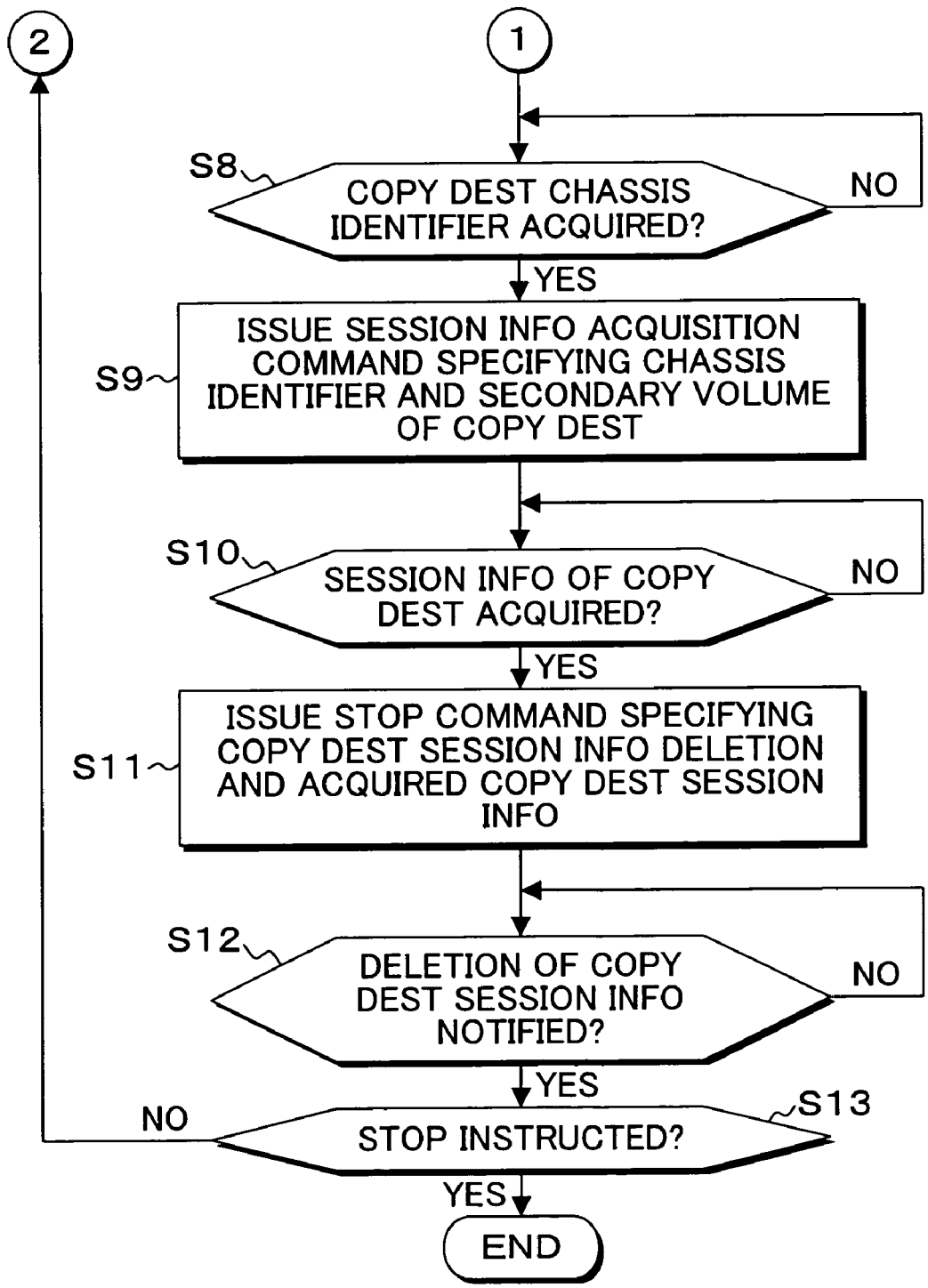

FIGS. 18A and 18B are a flow chart of the remote copy process performed by the host 10 of FIG. 3. In FIGS. 18A and 18B, the start command and the session information are issued in step S1, thereby giving an instruction of remote copy. Subsequently, whether or not there is blockage of the inter-chassis path is checked in step S2, and, if the blockage is detected, the forcible stop command is issued in step S3. Subsequently, whether or not the inter-chassis path is connected is checked in step S4, and, if the connection is detected, the start command of the forcibly stopped session is issued in step S5. If, in response to this, an error of the command is responded from the copy destination in step S6, the process proceeds to step S7 wherein the copy destination chassis identifier acquisition command is issued. If the chassis identifier is acquired from the copy destination in step S8, the session information acquisition command specifying the chassis identifier and the secondary volume of the copy destination is issued in step S9. When, in response to this, the session information is acquired from the copy destination in step S10, the stop command specifying deletion of the session information of the copy destination and the acquired copy destination session information is issued in step S11. Then, in step S12, when a copy destination session information deletion notification from the copy destination is received, the series of operations is stopped, and the process from step S1 is repeated until a stop instruction is given in step S13.

Figure 19A:
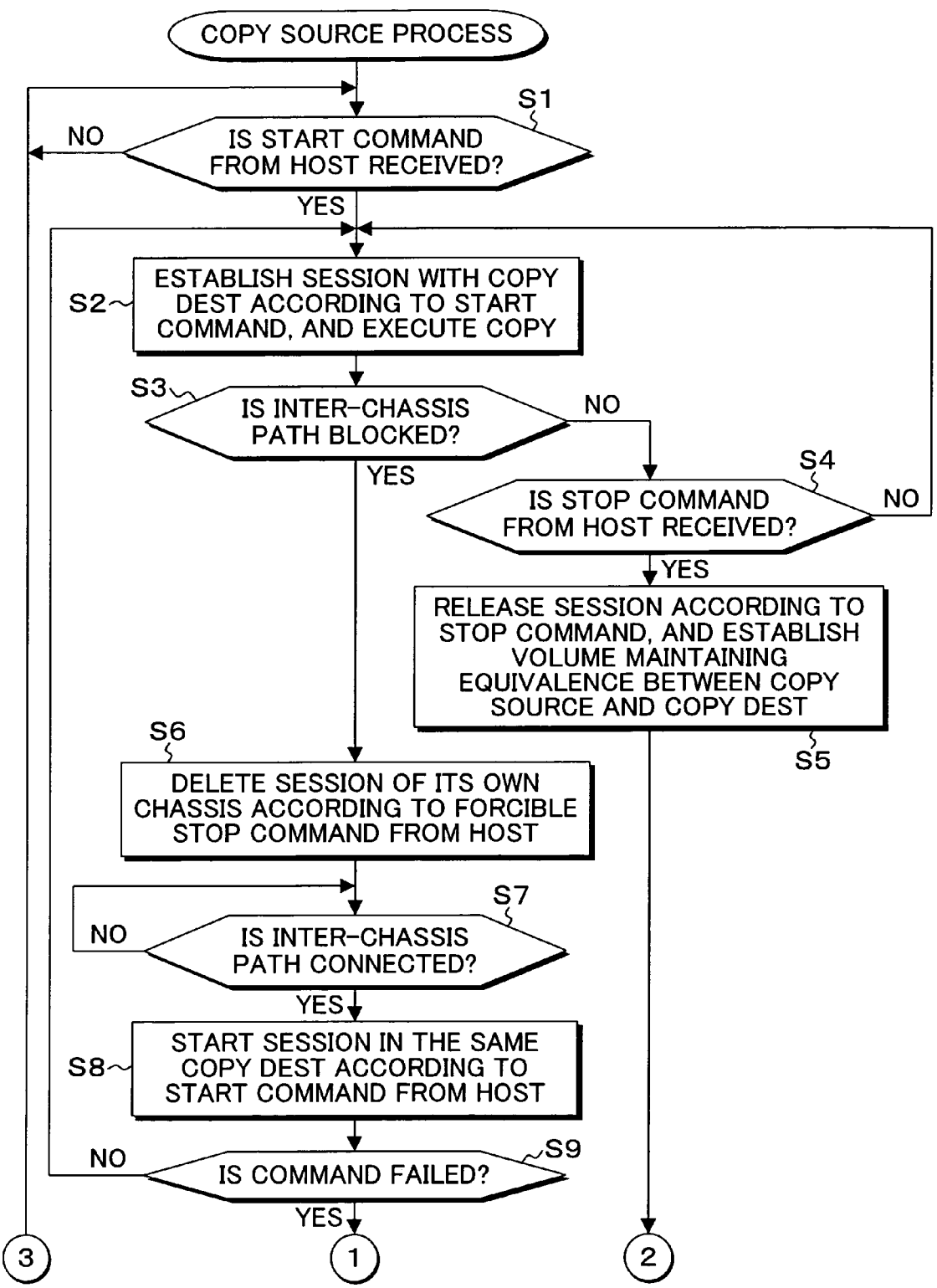
FIGS. 19A and 19B are flow charts of the copy source process performed by the first RAID device of FIG. 3.
Figure 19B:
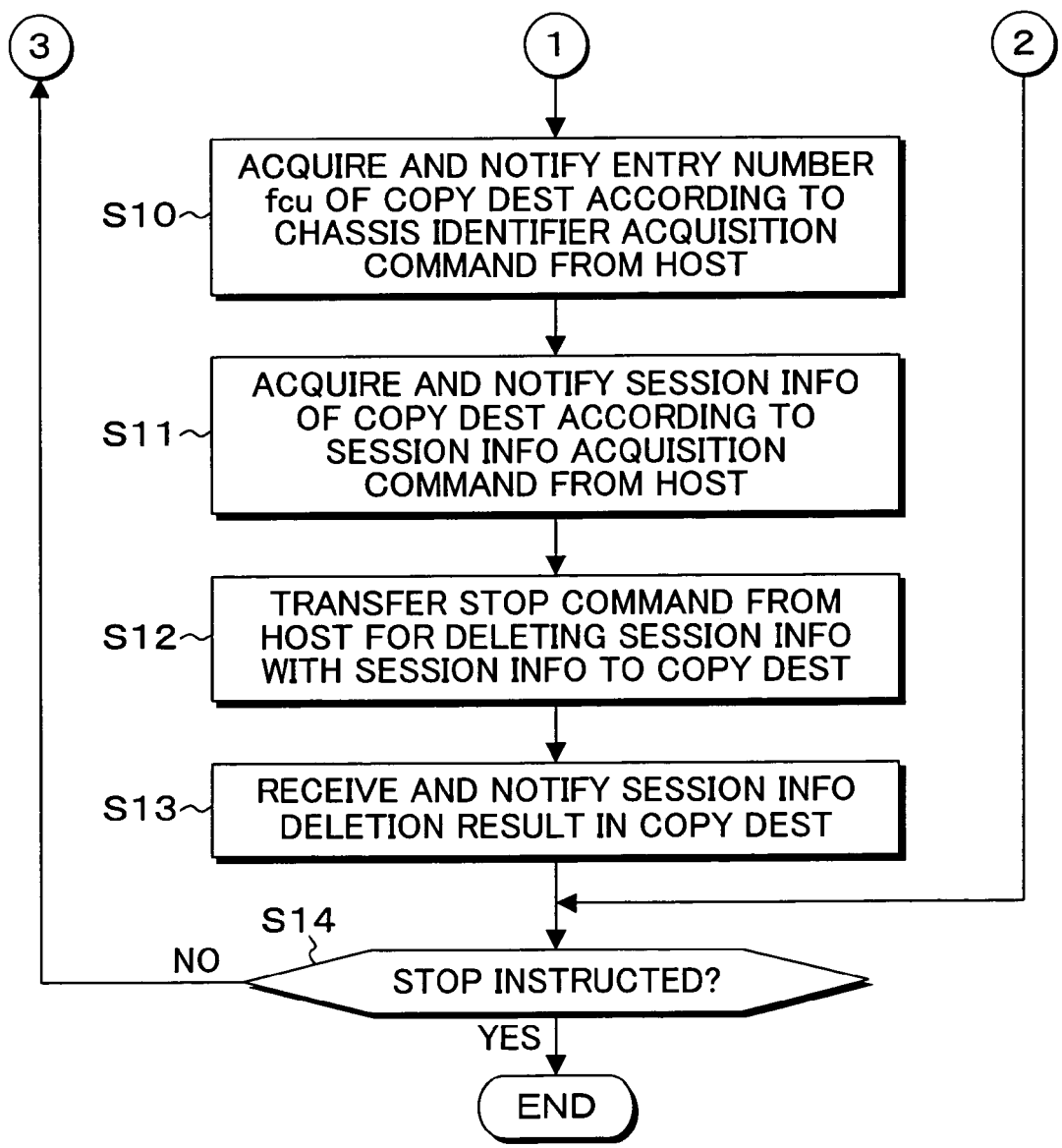

FIGS. 19A and 19B are flow charts of the copy source process performed by the first RAID device 12 of FIG. 3. In FIGS. 19A and 19B, if receipt of the start command from the host 10 is detected in step S1, the process proceeds to step S2 wherein, according to the session information notified with the start command, a session with the copy destination is established, thereby executing. remote copy. During execution of the remote copy, whether or not the inter-chassis path 18 is blocked is checked in step S3, and, if there is no blockage, whether or not the stop command from the host is received is checked in step S4. If the stop command from the host is received, the session is released by the stop command in step S5, thereby establishing volumes maintaining equivalence between the copy source and the copy destination. On the other hand, if blockage of the inter-chassis path is detected during remote copy in step S3, the process proceeds to step S6 wherein the session is released according to the forcible stop command from the host 10, thereby deleting the session information of the chassis of its own, and connection of the inter-chassis path is waited for in step S7. When the connection of the inter-chassis path is detected, the process proceeds to step S8 wherein it tries to start a session in the copy destination according to the start command from the host 10. However, if command failure is received from the copy destination, the process proceeds to step S10. If the command is successful in step S9, the process returns to step S2 wherein a session with the copy destination is established so as to resume remote copy. After the command failure is received from the copy destination and notified to the host in step S9, in step S10, the entry number "fcu number" of the copy destination is acquired according to the chassis identifier acquisition command from the host 10, and notified to the host 10. Subsequently, in step S11, the session information of the copy destination is acquired according to the session information acquisition command from the host and notified to the host 10. Furthermore, the stop command from the host 10 for deleting the session information is transferred to the copy destination together with the session information in step S12, and the session information deletion result of the copy destination is received and notified to the host 10 in step S13. The processes of steps S10 to S13 are processes of relaying commands and transfer data between the host and the second RAID device 14 of the copy destination. Then, until a stop instruction is given in step S14, the process from the step S1 is repeated.

Figure 20A:
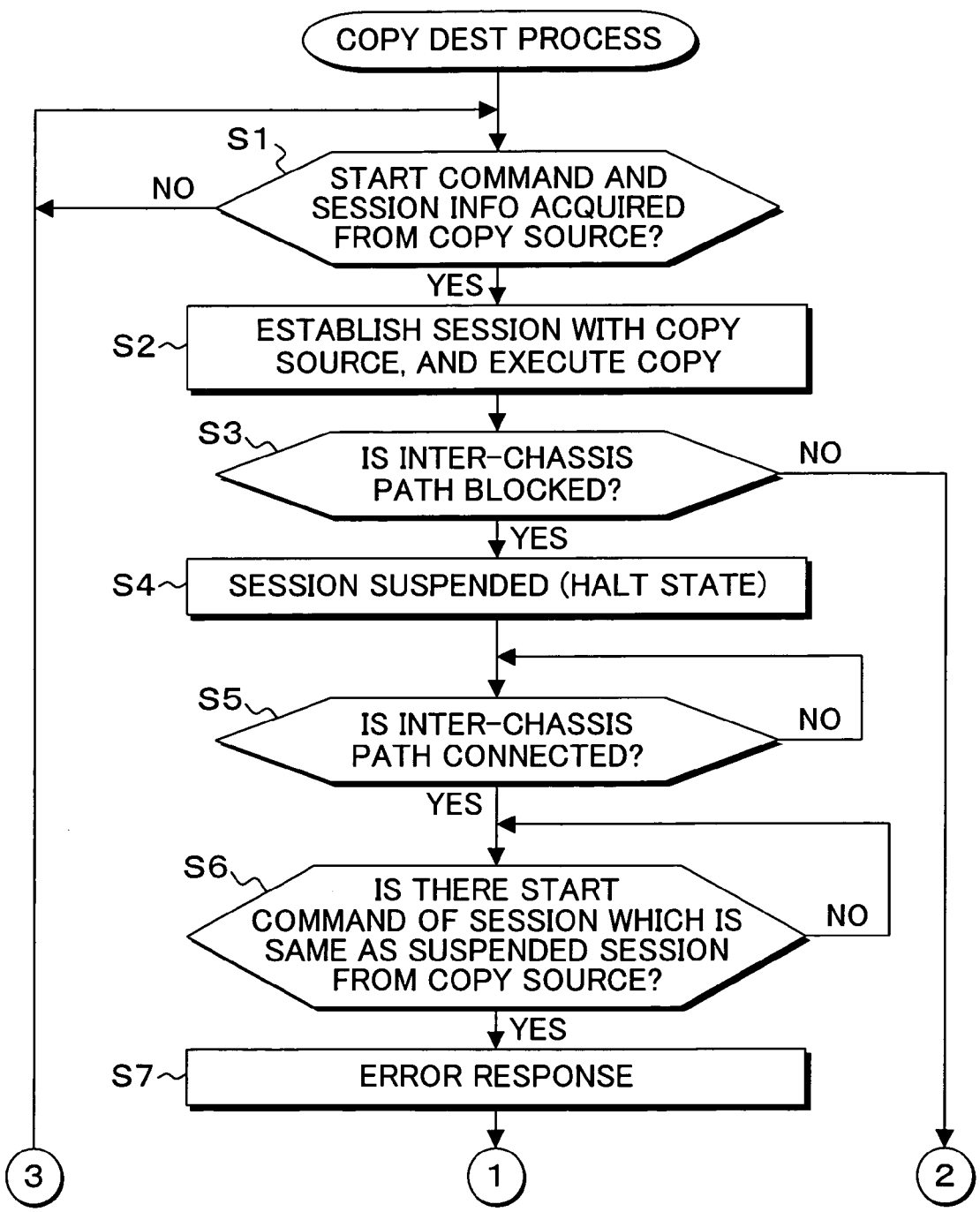
FIGS. 20A and 20B are flow charts of the copy destination process performed in the second RAID device of FIG. 3.
Figure 20B:
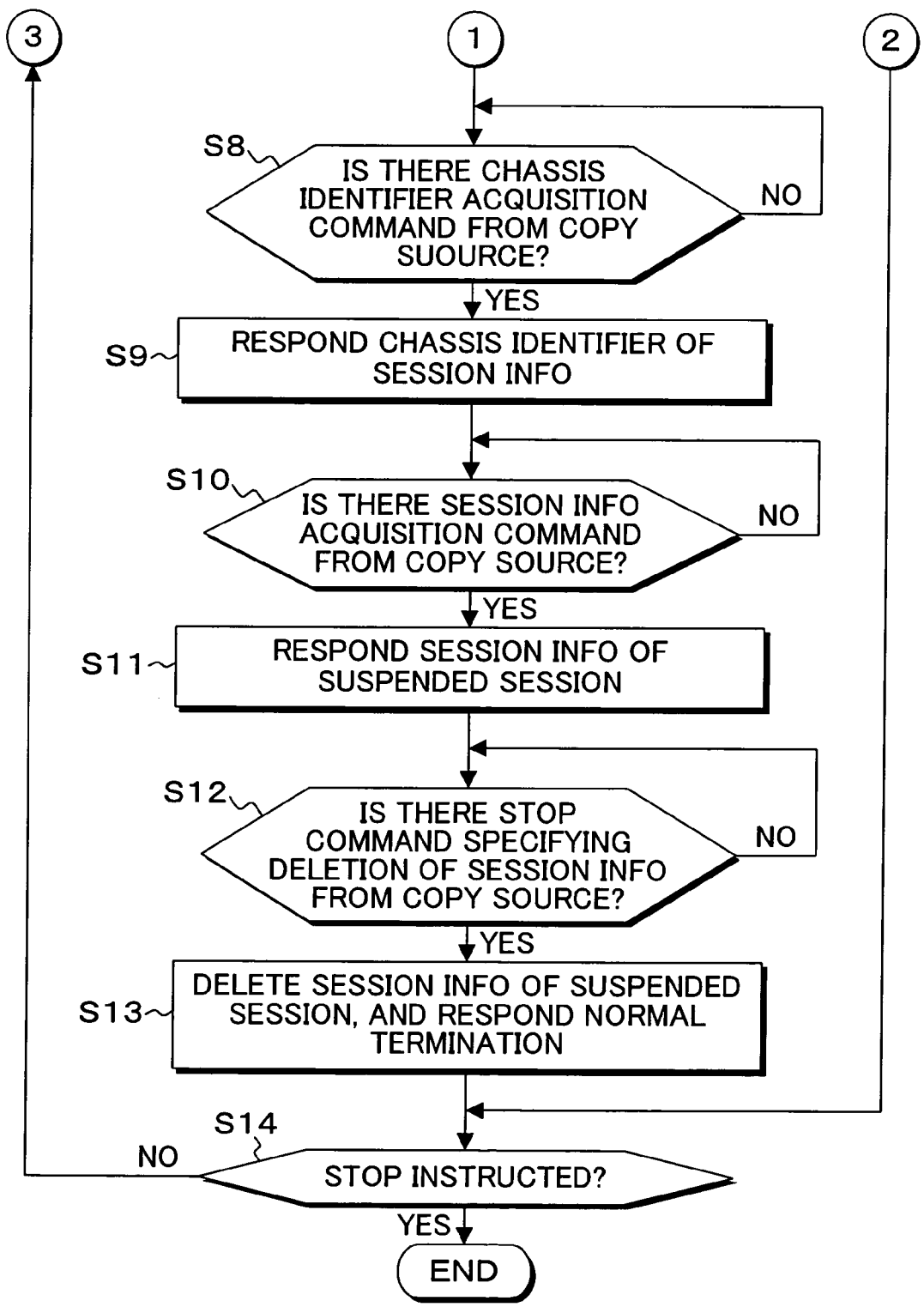

FIGS. 20A and 20B are flow charts of the copy destination process performed in the second RAID device 14 of FIG. 3. In FIGS. 20A and 20B, when the start command and the session information are acquired from the copy source in step S1, a session with the copy source is established, thereby executing remote copy in step S2. Subsequently, whether or not the inter-chassis path is blocked is checked in step S3, and, when the blockage is detected, a halt state is obtained due to the session suspension in step S4. Subsequently, connection of the inter-chassis path is checked in step S5, and, when the connection is detected, the start command of the session which is same as the suspended session from the copy source is detected in step S6 and the process proceeds to step S7 wherein, since the session information is remaining, a command error occurs and an error response is returned. Subsequently, when the chassis identifier acquisition command is received from the copy source in step S8, a response is made with the chassis identifier of the session information in step S9. Next, when the session information acquisition command is received from the copy source in step S10, a response is made with the suspended session, i.e., the remaining session information in step S11. Furthermore, when the stop command specifying deletion of the session information is received from the copy source together with the session information in step S12, the session information of the suspended session is deleted and a response is made with the normal completion in step S13. Then, the process from step S1 is repeated until a stop instruction is given in step S14. Moreover, the present invention provides a program for the processes of the remote copy executed by the host 10 of FIG. 3; wherein the program has the description that is according to the flow chart of FIGS. 18A and 18B, and, in remote copy using the commands provided by the command interface of the host shown in the command list shown in FIG. 7, particularly, in the present invention, upon blockage of the inter-chassis path during remote copy, the program is capable of executing a copy destination session information deleting process in which the session information remaining in the copy destination is deleted by an instruction given from the host to the copy source. The above described embodiment employs an example operation in which commands are input from the host 10 to the first RAID device 12 of the copy source, thereby deleting the session information of the RAID device 14 of the copy destination; however, inversely, a session may be established according to instructions from the host 10 with the second RAID device 14 serving as the copy source and the first RAID device 12 serving as the copy destination so as to perform remote copy. That is, it may be configured such that the first RAID 12 has the copy destination processing unit and the secondary volume, the second RAID device 14 has the copy source processing unit and the primary volume, and the host 10 is connected only to the first RAID device 12. In addition, the present invention is capable of similarly processing procedures as long as, in the procedures, commands are input to the first RAID device 12 of the copy source so as to execute setting and operations with respect to the second RAID device 14 of the copy destination. Such procedures causing the second RAID device 14 of the copy destination, which is connected by the inter-chassis path 18, to execute processes by inputting commands from the host 10 to the first RAID device of the copy source include, for example, the following.

(1) Setting and operations of a local copy session on the second RAID device 14 of the copy destination.
(2) Setting and operations of a remote copy session with another RAID device connected to the second RAID device 14 of the copy destination.
(3) To draw the information of a session which has already been set on the second RAID device 14 of the copy destination.
(4) Setting and operations of a cascade copy session in which the session which has already been set on the second RAID device 14 of the copy destination is interlocked with another session such that the secondary volume 28 serves as a primary and a copy is further transmitted to another secondary volume.
(5) Required setting and operations other than copy operations with respect to the second RAID device 14 of the copy destination. Such setting and operations of (1) to (5) can readily realize setting and operations required in the second RAID device 14 of the copy destination by modifying the setting of various commands which are already used by the host 10, for example, that provided in the command list 74 shown in FIG. 7 and transfer data into the form matching the setting and the operations. Furthermore, the present invention includes arbitrary modifications that do not impair the object and advantages thereof, and is not limited by the numerical values shown in the above described embodiments.

What is claimed is:

1. A remote copy processing method having a first RAID device connected to a host and a second RAID device connected to the first RAID device via an inter-device path, for establishing a session according to a copy instruction from the host and based on session information, and transferring and copying entire or partial data of a primary volume of the first RAID device which is specified as a copy source to the same position of a secondary volume of the second RAID device which is specified as a copy destination through the inter-device path, the remote copy processing method comprising:

a copy source session releasing step in which the host instructs the first RAID device of forcible stop of the session so as to cause the session information to be deleted when blockage of the inter-device path is recognized; and a copy destination session releasing step in which the host causes the session information remaining in the second RAID device to be deleted by an instruction given via the first RAID device when the forcibly terminated session is tried to be started when the blocked inter-device path is connected and results in an error.

2. The remote copy processing method described in claim 1 wherein the copy destination session releasing step comprises:

a chassis identifier acquisition step of issuing an instruction for acquiring a chassis identifier to the second RAID device via the first RAID device, so as to acquire, from the second RAID device, the identifier of a chassis which is permitted to perform communication between chassis establishing the session;

a session information acquisition step of issuing an instruction for acquiring the session information specifying the chassis identifier acquired in the chassis identifier acquisition step and the secondary volume to the second RAID device via the first RAID device, so as to acquire the session information from the second RAID device; and a session information deleting step of issuing an instruction for deleting the session information of the copy destination and the session information of the second RAID device acquired in the session information acquisition step to the second RAID device via the first RAID device, so as to delete the session information remaining in the second RAID device.

3. The remote copy processing method described in claim 2 wherein:

in the chassis identifier acquisition step, an entry number having a short data length and forming a pair with the chassis identifier as the chassis identifier of the second RAID device is acquired; and, in the session information acquisition step, the entry number and the secondary volume are specified so as to acquire the session information of the second RAID device.

4. A computer-readable storage medium which stores a program for processing a remote copy, wherein said program allows a computer of a host having a first RAID device connected to the host and a second RAID device connected to the first RAID device via an inter-device path, for establishing a session according to a copy instruction from the host and based on session information, and transferring and copying entire or partial data of a primary volume of the first RAID device which is specified as a copy source to the same position of a secondary volume of the second RAID device which is specified as a copy destination through the inter-device path to execute:

a copy source session releasing step of instructing the first RAID device of forcible stop of the session so as to cause the session information to be deleted when blockage of the inter-device path is recognized; and a copy destination session releasing step of causing the session information remaining in the second RAID device to be deleted by an instruction given via the first RAID device when the forcibly terminated session is tried to be started when the blocked inter-device path is connected and results in an error.

5. The computer-readable storage medium according to claim 4 wherein the copy destination session releasing step comprises:

a chassis identifier acquisition step of issuing an instruction for acquiring a chassis identifier to the second RAID device via the first RAID device, so as to acquire, from the second RAID device, the identifier of a chassis which is permitted to perform communication between chassis establishing the session;

a session information acquisition step of issuing an instruction for acquiring the session information specifying the chassis identifier acquired in the chassis identifier acquisition step and the secondary volume to the second RAID device via the first RAID device, so as to acquire the session information from the second RAID device; and a session information deleting step of issuing an instruction for deleting the session information of the copy destination and the session information of the second RAID device acquired in the session information acquisition step to the second RAID device via the first RAID device, so as to delete the session information remaining in the second RAID device.

6. The computer-readable storage medium according to claim 5 further comprising causing the computer of the host to, in the chassis identifier acquisition step, acquire an entry number having a short data length and forming a pair with the chassis identifier as the chassis identifier of the second RAID device; and, in the session information acquisition step, specify the entry number and the secondary volume so as to acquire the session information of the second RAID device.

7. A remote copy processing system having a first RAID device connected to a host and a second RAID device connected to the first RAID device via an inter-device path, for establishing a session according to a copy instruction from the host and based on session information, and transferring and copying entire or partial data of a primary volume of the first RAID device which is specified as a copy source to the same position of a secondary volume of the second RAID device which is specified as a copy destination through the inter-device path, the remote copy processing system comprising:

a copy source session releasing unit for instructing the first RAID device of forcible stop of the session so as to cause the session information to be deleted when blockage of the inter-device path is recognized; and a copy destination session releasing unit for causing the session information remaining in the second RAID device to be deleted by an instruction given via the first RAID device when the forcibly terminated session is tried to be started when the blocked inter-device path is connected and results in an error.

8. The remote copy processing system according to claim 7 wherein the copy destination session release processing unit comprises:

a chassis identifier acquisition unit for issuing an instruction for acquiring a chassis identifier to the second RAID device via the first RAID device, so as to acquire, from the second RAID device, the identifier of a chassis which is permitted to perform communication between chassis establishing the session;

a session information acquisition unit for issuing an instruction for acquiring the session information specifying the chassis identifier acquired in the chassis identifier acquisition unit and the secondary volume to the second RAID device via the first RAID device, so as to acquire the session information from the second RAID device; and a session information deleting unit for issuing an instruction for deleting the session information of the copy destination and the session information of the second RAID device acquired in the session information acquisition step to the second RAID device via the first RAID device, so as to delete the session information remaining in the second RAID device.

9. The remote copy processing system according to claim 8 wherein:

the chassis identifier acquisition unit acquires an entry number having a short data length and forming a pair with the chassis identifier as the chassis identifier of the second RAID device; and, the session information acquisition unit specfies the entry number and the secondary volume so as to acquire the session information of the second RAID device.

10. A remote copy processing method comprising:

establishing a session according to a copy instruction from a host and based on session information;

transferring and copying entire or partial data of a primary volume of a first RAID device which is specified as a copy source to the same position of a secondary volume of a second RAID device which is specified as a copy destination through an inter-device path, wherein the host instructs the first RAID device of forcible stop of the session so as to cause the session information to be deleted when a blockage of the inter-device path is recognized by the host, and the host causes the session information remaining in the second RAID device to be deleted by an instruction given via the first RAID device when an error results by attempting to start the forcibly terminated session when the blocked inter-device path is connected.

* * * * *

UNITED STATES PATENT AND TRADEMARK OFFICE
CERTIFICATE OF CORRECTION

| | |
|---|---|
| PATENT NO. | : 7,434,094 B2 |
| APPLICATION NO. | : 11/182846 |
| DATED | : October 7, 2008 |
| INVENTOR(S) | : Kenichi Fujita et al. |

Page 1 of 1

It is certified that error appears in the above-identified patent and that said Letters Patent is hereby corrected as shown below:

Column 18, Line 27, change "specfies" to --specifies--.

Signed and Sealed this

Twenty-third Day of December, 2008

JON W. DUDAS
*Director of the United States Patent and Trademark Office*